(12) United States Patent
Spadacini et al.

(10) Patent No.: US 11,873,739 B2
(45) Date of Patent: Jan. 16, 2024

(54) PLANT AND PROCESS FOR ENERGY MANAGEMENT

(71) Applicant: ENERGY DOME S.P.A., Milan (IT)

(72) Inventors: Claudio Spadacini, Milan (IT); Dario Rizzi, Milan (IT)

(73) Assignee: ENERGY DOME S.P.A., Milan (IT)

( * ) Notice: Subject to any disclaimer, the term of this patent is extended or adjusted under 35 U.S.C. 154(b) by 0 days.

(21) Appl. No.: 18/001,951

(22) PCT Filed: Jun. 8, 2021

(86) PCT No.: PCT/IB2021/055024
§ 371 (c)(1),
(2) Date: Dec. 15, 2022

(87) PCT Pub. No.: WO2021/255578
PCT Pub. Date: Dec. 23, 2021

(65) Prior Publication Data
US 2023/0220788 A1 Jul. 13, 2023

(30) Foreign Application Priority Data

Jun. 18, 2020 (IT) .......................... 102020000014566

(51) Int. Cl.
*F01K 13/02* (2006.01)
*F01K 3/12* (2006.01)
(Continued)

(52) U.S. Cl.
CPC ................ *F01K 13/02* (2013.01); *F01K 3/12* (2013.01); *F01K 3/14* (2013.01); *F01K 7/32* (2013.01);
(Continued)

(58) Field of Classification Search
CPC . F01K 7/32; F01K 13/02; F01K 13/12; F01K 25/06; F01K 25/10; F02C 1/10
See application file for complete search history.

(56) References Cited

U.S. PATENT DOCUMENTS

2015/0260463 A1    9/2015   Laughlin et al.
2017/0159495 A1    6/2017   Laughlin et al.
(Continued)

FOREIGN PATENT DOCUMENTS

GB           2484080 A   *   4/2012  .......... F01K 25/103
WO   WO 2014/052927 A1    4/2014
(Continued)

OTHER PUBLICATIONS

International Search Report dated Oct. 11, 2021 in PCT/IB2021/055024 filed on Jun. 8, 2021, 4 pages.
(Continued)

*Primary Examiner* — Audrey B. Walter
(74) *Attorney, Agent, or Firm* — Oblon, McClelland, Maier & Neustadt, L.L.P.

(57) ABSTRACT

A process for energy management includes actuating a closed cyclic thermodynamic transformation, first in one direction in a charge configuration/phase and then in the opposite direction in a discharge configuration/phase, between a casing for the storage of a working fluid other than atmospheric air, in gaseous phase and in equilibrium of pressure with the atmosphere, and a tank for the storage of the working fluid in liquid or super-critical phase with a temperature close to its own critical temperature. In the
(Continued)

charge phase, the process accumulates heat and pressure. In the discharge phase, the process generates energy. The process includes actuating, with at least one part of the working fluid, at least one closed thermodynamic cycle, even at the same time as the charge phase or as the discharge phase; and heating the working fluid by means of at least one oxy-combustion within the closed thermodynamic cycle.

30 Claims, 16 Drawing Sheets

(51) Int. Cl.
*F01K 3/14* (2006.01)
*F01K 7/32* (2006.01)
*F01K 25/06* (2006.01)
*F01K 25/10* (2006.01)
*F02C 1/10* (2006.01)

(52) U.S. Cl.
CPC .............. *F01K 25/06* (2013.01); *F01K 25/10* (2013.01); *F02C 1/10* (2013.01)

(56) References Cited

U.S. PATENT DOCUMENTS

| | | |
|---|---|---|
| 2017/0159496 A1 | 6/2017 | Laughlin et al. |
| 2017/0159497 A1 | 6/2017 | Laughlin et al. |
| 2017/0159498 A1 | 6/2017 | Laughlin et al. |
| 2017/0159499 A1 | 6/2017 | Laughlin et al. |
| 2017/0159500 A1 | 6/2017 | Laughlin et al. |
| 2017/0321967 A1 | 11/2017 | Laughlin et al. |
| 2018/0187628 A1 | 7/2018 | Apte |
| 2019/0195571 A1 | 6/2019 | Laughlin et al. |
| 2019/0212070 A1 | 7/2019 | Laughlin et al. |

FOREIGN PATENT DOCUMENTS

| | | | |
|---|---|---|---|
| WO | WO 2018/146624 A1 | 8/2018 | |
| WO | WO 2020/039416 A2 | 2/2020 | |
| WO | WO 2020/039416 A3 | 2/2020 | |

OTHER PUBLICATIONS

Written Opinion dated Oct. 11, 2021 in PCT/IB2021/055024 filed on Jun. 8, 2021, 6 pages.

* cited by examiner

PLANT AND PROCESS FOR ENERGY MANAGEMENT

FIELD OF THE FINDING

The object of the present invention is a plant and a process for energy management, where with management it is intended the generation, the transformation, the absorption and the storage of energy.

More precisely, the object of the present invention is a system capable of generating energy, absorbing/using energy, maintaining the energy stored over time and capable of retransforming it into energy, for example thermal, mechanical and/or electrical.

More in detail, the present invention relates to a system for generating energy by means of oxy-combustion and from possible further sources and for storing energy in the form of potential energy (pressure) and thermal/thermodynamic energy, through the actuation of a thermodynamic cycle and/or of a cyclic thermodynamic transformation.

The present invention is also situated in the field of systems for capture and sequester (CCS) of the carbon dioxide ($CO_2$) from oxy-combustion or from other sources.

The present invention is situated for example in the field of systems of generation from various sources and for storing energy of medium and large scale, for both land and sea applications, typically with powers ranging from hundreds of kW to tens of MW (e.g. 20-25 MW), but also hundreds of MW, and with storage capacities ranging from a few hundred kWh to hundreds of MWh and even up to several GWh.

The present invention can also be situated in the field of systems of generation from various sources and for storing energy of small scale, for home and commercial applications, both land and sea, typically with powers ranging from a few kW to several hundred kW and with storage capacity from a few kWh up to hundreds of kWh.

Definitions

In the present description and in the enclosed claims, reference will be made to the following definitions.

Thermodynamic cycle (TC): thermodynamic transformation from a point X to a point Y, where X coincides with Y; the TC unlike the CTT (Cyclic thermodynamic transformation) mentioned below does not have mass accumulations (significant for energy purposes) within the cycle, while the CTT typically works between two working fluid storages, one initial and the other final;

Cyclic thermodynamic transformation (CTT): thermodynamic transformation from a point X to a point Y and from a point Y to a point X, without necessarily passing from the same intermediate points;

Closed TC and/or CTT: with no mass exchange (significant for energy purposes) with the atmosphere;

Open TC and/or CTT: with mass exchange (significant for energy purposes) with the atmosphere.

BACKGROUND OF THE FINDING

The public document WO/2020/039416, in the name of the same Applicant, illustrates an energy storage plant and process. The plant comprises a casing for the storage of a working fluid other than atmospheric air, in gaseous phase and in equilibrium of pressure with the atmosphere; a tank for the storage of such working fluid in liquid or supercritical phase with a temperature close to the critical temperature, in which the critical temperature is close to the ambient temperature. The plant is configured to perform a closed cyclic thermodynamic transformation, first in one direction in a charge configuration and then in an opposite direction in a discharge configuration, between the casing and the tank. In the charge configuration the plant stores heat and pressure and in the discharge configuration the plant generates energy.

The public document U.S. Pat. No. 8,596,075 (Rodney John Allam) illustrates a system for generating power, using a high-efficiency combustor in combination with a recirculation of carbon dioxide, in which the carbon dioxide deriving from the combustion of the fuel is captured.

SUMMARY

The Applicant has observed that the processes and plants described above in WO/2020/039416 and in U.S. Pat. No. 8,596,075 can be further improved, in particular with reference to the flexibility of the same.

The Applicant has in particular felt the need to make a system (plant and process) for generation, absorption, transformation and storage of energy (Energy Storage) such to allow managing (generating, accumulating, absorbing, transforming, switching) the energy coming from various sources (non-renewable sources and fuels, such as fossil fuels, and renewable and even synthetic sources and fuels) in a flexible, efficient and effective manner.

In such context, the Applicant has also set as objective to ideate and make a system that allows generating and converting energy without introducing carbon dioxide $CO_2$ into the atmosphere or even contributing to the reduction thereof, i.e. absorbing $CO_2$ produced by other industrial processes.

The Applicant has found that the above-indicated objectives and still others can be achieved by means of a system operating through cyclic thermodynamic transformations (CTT) of a working fluid, like that illustrated in WO/2020/039416, in which a closed thermodynamic cycle (TC) is integrated that is attained with at least one part of the same working fluid and in which the heating of the working fluid is mainly obtained by means of an oxy-combustion within the cycle.

In the present description and in the enclosed claims, by oxy-combustion within the cycle it is intended that the fuel and the oxygen and the products of the oxy-combustion are in direct contact with the working fluid and said combustion products come to be part, at least partially, of the working fluid.

In particular, the above-indicative objectives and still others are substantially achieved by a plant and by a process for managing (generating, absorbing, accumulating, transforming) energy of the type claimed in the enclosed claims and/or described in the following aspects.

In an independent aspect, the present invention regards a plant for energy management, comprising:
  a working fluid other than atmospheric air;
  at least one casing configured to store the working fluid in gaseous phase and in equilibrium of pressure with the atmosphere;
  at least one tank configured to store said working fluid in liquid or super-critical phase with a temperature close to its own critical temperature;
  ducts operationally interposed between the casing and the tank and connecting, directly and/or indirectly, the casing with the tank; wherein the ducts delimit:

at least one charge path extending from the casing to the tank, at least one discharge path extending from the tank to the casing, and at least one closed circuit in fluid communication with the discharge path and with the charge path;

at least one expander arranged along the ducts and configured to expand the working fluid;

at least one compressor arranged along the ducts and configured to compress the working fluid;

heat exchangers arranged along the ducts and configured to transfer heat to the working fluid or to absorb heat from the working fluid;

at least one combustion chamber arranged along the ducts and configured to actuate an oxy-combustion and to heat the working fluid therewith;

wherein the plant is configured to actuate at least one closed cyclic thermodynamic transformation with the working fluid, first in one direction in a charge configuration and then in the opposite direction in a discharge configuration, between said casing and said tank;

wherein the plant is also configured to actuate at least one closed thermodynamic cycle in said closed circuit with said working fluid, optionally while said plant is in the charge configuration or in the discharge configuration;

wherein the combustion chamber is operationally active at least in the closed circuit in order to heat the working fluid by means of an oxy-combustion within the closed thermodynamic cycle and the closed cyclic thermodynamic transformation during charging/accumulation.

In an independent aspect, the present invention regards a process for energy management, comprising:

actuating a closed cyclic thermodynamic transformation, first in one direction in a charge configuration/phase and then in the opposite direction in a discharge configuration/phase, between a casing for the storage of a working fluid other than atmospheric air, in gaseous phase and in equilibrium of pressure with the atmosphere, and a tank for the storage of said working fluid in liquid or super-critical phase with a temperature close to its own critical temperature; wherein in the charge phase the process accumulates heat and potential energy in the form of pressure and in the discharge phase it generates energy;

actuating, with at least one part of said working fluid, at least one closed thermodynamic cycle, optionally at the same time as the charge phase or with the discharge phase;

wherein the process comprises: heating the working fluid by means of at least one oxy-combustion within the closed thermodynamic cycle.

Optionally, the process is actuated with the plant according to the preceding aspect and/or according to one or more of the following aspects.

Optionally, the working fluid has the following chemical-physical properties: critical temperature comprised between 0° C. and 200° C., density a 25° C. comprised between 0.5 kg/m$^3$ and 10 kg/m$^3$.

Optionally, the working fluid comprises or consists of $CO_2$ and/or $N_2O$.

Optionally, the working fluid is a mixture of gas comprising $CO_2$ and/or $N_2O$.

Optionally, the products generated by the oxy-combustion comprise $CO_2$ and/or $N_2O$.

The Applicant has verified that the plant and the process according to the invention allow obtaining the pre-established objectives.

In particular, the Applicant has verified that the invention allows managing the absorbed, stored, returned and generated energy in a flexible and effective manner.

The Applicant has verified that the invention allows using and/or storing products, like carbon dioxide $CO_2$ or nitrogen oxide $N_2O$, coming from other processes.

The Applicant has in particular verified that the invention allows automatically capturing $CO_2$ from an existing process and it makes it available for storage or other aims and simultaneously generates energy with the possibility of storing it. The plant and process according to the invention can be integrated with pre-existing plants/industrial processes, rendering the capture of $CO_2$ intrinsic.

The Applicant has verified that the invention allows generating and converting energy without introducing carbon dioxide into the atmosphere or even contributing to the reduction thereof.

The Applicant has in particular verified that the plant and/or process according to the present invention can be integrated with plants/industrial processes which produce gas and can use and/or capture such gas products.

Aspects of the invention are listed hereinbelow.

In one aspect, the expander comprises at least one expansion turbine.

In one aspect, the compressor comprises at least one turbocharger.

In one aspect, said at least one expander comprises a plurality of expanders arranged in series.

In one aspect, said at least one compressor is of the type with or without inter-cooling.

In one aspect, said at least one compressor comprises a plurality of compressors arranged in series, with or without inter-cooling between said compressors.

In one aspect, said at least one combustion chamber is placed upstream of the expanders and/or between the expanders.

In one aspect, said at least one combustion chamber is part of a turbomachine comprising said turbine and said turbocharger.

In one aspect, the combustion chamber is configured to receive, directly or indirectly, a fuel and oxygen.

In one aspect, provision is made for introducing fuel and oxygen directly or indirectly into the combustion chamber in which the working fluid flows.

In one aspect, the combustion chamber has an inlet for the fuel and/or for the oxygen.

In one aspect, the fuel is introduced in a suction of said at least one compressor or of an auxiliary compressor dedicated for such purpose, optionally at atmospheric pressure.

In one aspect, the oxygen is compressed, optionally by means of a dedicated compressor, before being introduced.

In one aspect, the fuel comprises products containing carbon.

In one aspect, the fuel comprises products containing nitrogen.

In one aspect, the fuel is selected from the group comprising: methane and other fossil fuels, LNG, synthetic fuels such as SNG (Synthetic Natural Gas), LSF, ammonia $NH_3$, hydrazine, urea.

In one aspect, the fuel comprises gas resulting from industrial processes, e.g. steel-making processes such as BFG (Blast Furnace Gas), Converter Gas like LDG (Linz-Donawitz Converter Gas), or process gas from Direct Reduce Iron.

In one aspect, another object of the present invention is a steel plant comprising or operationally associated with a plant for energy management according to the present invention and/or a steel-making process comprising or operationally associated with a process for energy management according to the present invention, in which the gases produced by said steel plant and/or resulting from said steel-making process are at least partly used as fuel in the plant and/or in the process for energy management according to the present invention.

In one aspect, the combustion chamber is configured to introduce products generated by the oxy-combustion into the ducts, like carbon dioxide or nitrogen oxide.

In one aspect, the products generated by the oxy-combustion, like carbon dioxide produced by the oxy-combustion or nitrogen oxide produced by the oxy-combustion come to be part of the working fluid and of the closed cyclic thermodynamic transformation and/or of the closed thermodynamic cycle.

In one aspect, it is provided that the oxy-combustion occurs with an excess of fuel or oxygen, so that a part of fuel or of oxygen becomes part of the working fluid and circulates in the ducts.

In one aspect, a mixer is provided which is arranged on the ducts, optionally upstream of the combustion chamber.

In one aspect, the mixer has an inlet for the oxygen and/or for the fuel.

In one aspect, the working fluid passes through the mixer.

In one aspect, said mixer is configured to mix the oxygen and/or the fuel and the working fluid before entering into the combustion chamber.

In one aspect, provision is made for separating at least one of the products generated by the oxy-combustion, e.g. carbon dioxide or nitrogen oxide, from other products of the oxy-combustion and extracting said other products from the process.

In one aspect, a separator of at least one of the products generated by the oxy-combustion, e.g. of carbon dioxide or nitrogen oxide, is arranged downstream of an outlet of the expander and is configured to separate said at least one of the products generated by the oxy-combustion from other products of the oxy-combustion, such as for example water.

In one aspect, the separator is configured to extract said other products (such as for example water) from the ducts.

In one aspect, at least one extraction duct is provided, in fluid communication with the ducts and/or with the tank and/or with the casing to enable extracting the working fluid from the plant in a controlled manner.

In one aspect, provision is made for extracting in a controlled manner said at least one of the products generated by the oxy-combustion, such as carbon dioxide, from the closed cyclic thermodynamic transformation and/or from the closed thermodynamic cycle in order to store it and/or send it to a user.

In one aspect, said extraction duct is connected to a system of capture and sequestration of the carbon dioxide.

In one aspect, at least one inlet duct is provided in fluid communication with the ducts and/or with the tank and/or with the casing in order to allow introducing the working fluid in the plant in a controlled manner.

In one aspect, provision is made for introducing from outside and in a controlled manner a product coming from other industrial processes, such as for example carbon dioxide, in the closed cyclic thermodynamic transformation and/or in the closed thermodynamic cycle.

In one aspect, said introduced carbon dioxide derives from industrial processes or from the gasification of biomasses.

In one aspect, said introduced carbon dioxide derives from industrial processes of transformation of minerals into non-ferrous and/or more precious materials.

In one aspect, said inlet duct is connected to a system of capture and sequestration of the carbon dioxide.

In one aspect, the sequestered carbon dioxide is stored in tanks or underground, e.g. through re-injection wells.

In one aspect, a recuperator is operationally active on the closed circuit to recover heat from the working fluid exiting from the expander and transfer it to the working fluid entering the combustion chamber.

In one aspect, said heat exchangers comprise: a first heat exchanger placed, on the charge path, between an outlet of the expander and the tank and/or placed, on the discharge path, between the tank and the combustion chamber.

In one aspect, the first heat exchanger is placed near the tank.

In one aspect, said first heat exchanger is configured to absorb heat from the working fluid in the charge configuration and/or to transfer heat to the working fluid in the discharge configuration.

In one aspect, said heat exchangers comprise: a second heat exchanger placed, on the discharge path, between an outlet of the expander and the casing and/or placed, in the closed circuit, between the outlet of the expander and an inlet of the compressor.

In one aspect, said second heat exchanger is configured to absorb heat from the working fluid in the discharge configuration and/or to absorb heat from the working fluid in the closed thermodynamic cycle.

In one aspect, the second heat exchanger is placed, on the discharge path and in the closed circuit, between the recuperator and the separator.

In one aspect, the second heat exchanger is placed, on the discharge path, between the separator and the casing and, in the closed circuit, between the separator and the compressor.

In one aspect, said heat exchangers comprise a thermal accumulator placed, on the charge path, between an outlet of the compressor and the tank and/or placed, on the discharge path, between the tank and the combustion chamber and/or placed in the closed circuit.

In one aspect, said thermal accumulator is configured to absorb heat from the working fluid and to store thermal energy in the charge configuration and/or to transfer heat to the working fluid in the discharge configuration.

In one aspect, the first heat exchanger is placed between the tank and the thermal accumulator.

In one aspect, a further heat exchanger is provided, operationally associated with an additional external heat source, in order to receive heat from said additional external heat source, and operationally placed on the discharge path and in the closed circuit and upstream of the combustion chamber.

In one aspect, the additional external heat source is a methanation plant dedicated to the conversion of hydrogen into Synthetic Natural Gas through the exothermic reaction $H+CO_2=CH_4+H_2O+heat$.

In one aspect, at least one pump is configured to increase an inlet pressure in the expander.

In one aspect, provision is made for extracting from the working fluid non-condensable gases.

In one aspect, a device is provided for the extraction of non-condensable gases, optionally of continuous or batch operating type.

In one aspect, the device for the extraction of non-condensable gases is connected to the tank.

In one aspect, the device for the extraction of non-condensable gases comprises an expander and/or a heater and/or a cooler (in order to increase the condensation efficiency).

In one aspect, the non-condensable gases are heated before expansion.

In one aspect, the closed thermodynamic cycle is recuperative.

In one aspect, the closed thermodynamic cycle works between a maximum pressure and a minimum pressure.

In one aspect, the maximum pressure of the closed thermodynamic cycle is equal to or lower than a maximum pressure of the process, i.e. of a storage pressure.

In one aspect, the maximum pressure of the closed thermodynamic cycle is greater than a maximum pressure of the process, i.e. of a storage pressure.

In one aspect, the maximum pressure of the closed thermodynamic cycle is lower than a condensation pressure of the working fluid, optionally comprised between 15 bar and 45 bar.

In one aspect, the minimum pressure of the closed thermodynamic cycle is comprised between 1 bar and 5 bar.

In one aspect, the minimum pressure of the closed thermodynamic cycle is equal to or greater than a minimum pressure of the process.

In one aspect, the ducts connect the casing with an inlet of the compressor.

In one aspect, the ducts connect an outlet of the compressor with the tank and/or with an inlet of the combustion chamber.

In one aspect, the ducts connect an outlet of the combustion chamber with an inlet of the expander.

In one aspect, the ducts connect an outlet of the expander with an inlet of the compressor and/or with the casing.

In one aspect the ducts comprise a first connector and/or bypass duct configured for channeling the working fluid coming from the compressor towards the tank and/or towards the combustion chamber and in order to channel the working fluid coming from the tank towards the combustion chamber.

In one aspect, the first heat exchanger and the possible thermal accumulator are placed on one section of the ducts extended between the first connector and/or bypass duct and the tank.

In one aspect, the first heat exchanger is placed between an outlet of the compressor and the first connector and/or bypass duct, while the thermal accumulator is placed between the first connector and/or bypass duct and an inlet of the combustion chamber.

In one aspect, the recuperator is interposed between an outlet of the compressor and the first connector and/or bypass duct and is interposed between an outlet of the expander and the second heat exchanger.

In one aspect, the recuperator is interposed between the first connector and/or bypass duct and an inlet of the combustion chamber and is interposed between an outlet of the expander and the second heat exchanger.

In one aspect, at least one auxiliary compressor is provided that is operating on the charge path and not on the closed circuit in order to obtain a maximum pressure of the closed thermodynamic cycle lower than the maximum pressure of the process, i.e. lower than the storage pressure.

In one aspect, the ducts comprise a second connector and/or bypass duct configured for channeling the working fluid coming from the expander towards the casing and/or towards the compressor and for channeling the working fluid coming from the casing towards the compressor.

In one aspect, the compressor, the first heat exchanger and/or the thermal accumulator are operationally active in the charge path.

In one aspect, the first heat exchanger and/or the thermal accumulator, the combustion chamber, the expander, optionally the recuperator, optionally the separator, optionally the pump, the second heat exchanger are operationally active in the discharge path.

In one aspect, the expander, optionally the recuperator, optionally the separator, optionally the pump, the second heat exchanger, the compressor and the combustion chamber are operationally active in the closed circuit.

In one aspect, said at least one expander comprises an expander at high pressure and an expander at low pressure connected in series and optionally an expander at medium pressure interposed between the expander at high pressure and the expander at low pressure.

In one aspect, said at least one combustion chamber with the possible mixer is operationally interposed between the expander at high pressure and the expander at low pressure and/or between the expander at high pressure and the expander at medium pressure and/or between the expander at medium pressure and the expander at low pressure and/or upstream of the expander at low pressure.

In one aspect, the first heat exchanger, the second heat exchanger, optionally heat exchangers of the inter-coolings, are connected to a circuit of fluid, optionally water, optionally at atmospheric pressure.

In one aspect, the first heat exchanger, the second heat exchanger, optionally heat exchangers of the inter-coolings, are connected to the same fluid circuit.

In one aspect, the fluid circuit comprises a tub, optionally in equilibrium with the atmospheric pressure.

In one aspect, the compressor is mechanically connected to a motor, optionally electric, or to a motor generator.

In one aspect, the expander is connected to an operating machine, to an electrical generator or to a motor generator.

In one aspect, the expander and the compressor are mechanically connected to a same motor generator.

In one aspect, connection/disconnection devices, e.g. of friction type, are operationally interposed between the compressor and the motor or motor generator and/or between the expander and the operating machine, the electrical generator or the motor generator.

In one aspect, the operating machine is an air division/separation unit.

In one aspect, the casing has variable volume, preferably defined by a pressure-balloon or a gasometer.

Further characteristics and advantages will be clearer from the detailed description of preferred but not exclusive embodiments of a plant and of a process in accordance with the present invention.

DESCRIPTION OF THE DRAWINGS

Such description will be set forth hereinbelow with reference to the enclosed drawings, provided only as a non-limiting example, in which.

DETAILED DESCRIPTION

With reference to the enclosed figures, reference number 1 overall indicates a plant for energy management according to the present invention.

The plant 1 operates with a working fluid other than atmospheric air and comprising a working fluid which has the following chemical-physical properties: critical temperature comprised between 0° C. and 200° C., density at 25° C. comprised between 0.5 kg/m$^3$ and 10 kg/m$^3$. In the preferred but not exclusive embodiments illustrated herein, such working fluid comprises carbon dioxide $CO_2$. In embodiment variants, the working fluid comprises for example nitrogen oxide $N_2O$ or a mixture of $CO_2$ and $N_2O$.

The plant 1 is configured to actuate a closed cyclic thermodynamic transformation (CTT), first in one direction in a charge configuration/phase and then in the opposite direction in a discharge configuration/phase, in which in the charge configuration the plant 1 accumulates heat and pressure and in the discharge configuration it generates electrical and/or mechanical energy.

The plant 1 is also configured to define/delimit a closed circuit and to actuate a closed thermodynamic cycle (TC) in said closed circuit with at least a part of the same working fluid, also while said plant 1 is in the charge configuration or in the discharge configuration.

Figure 1:
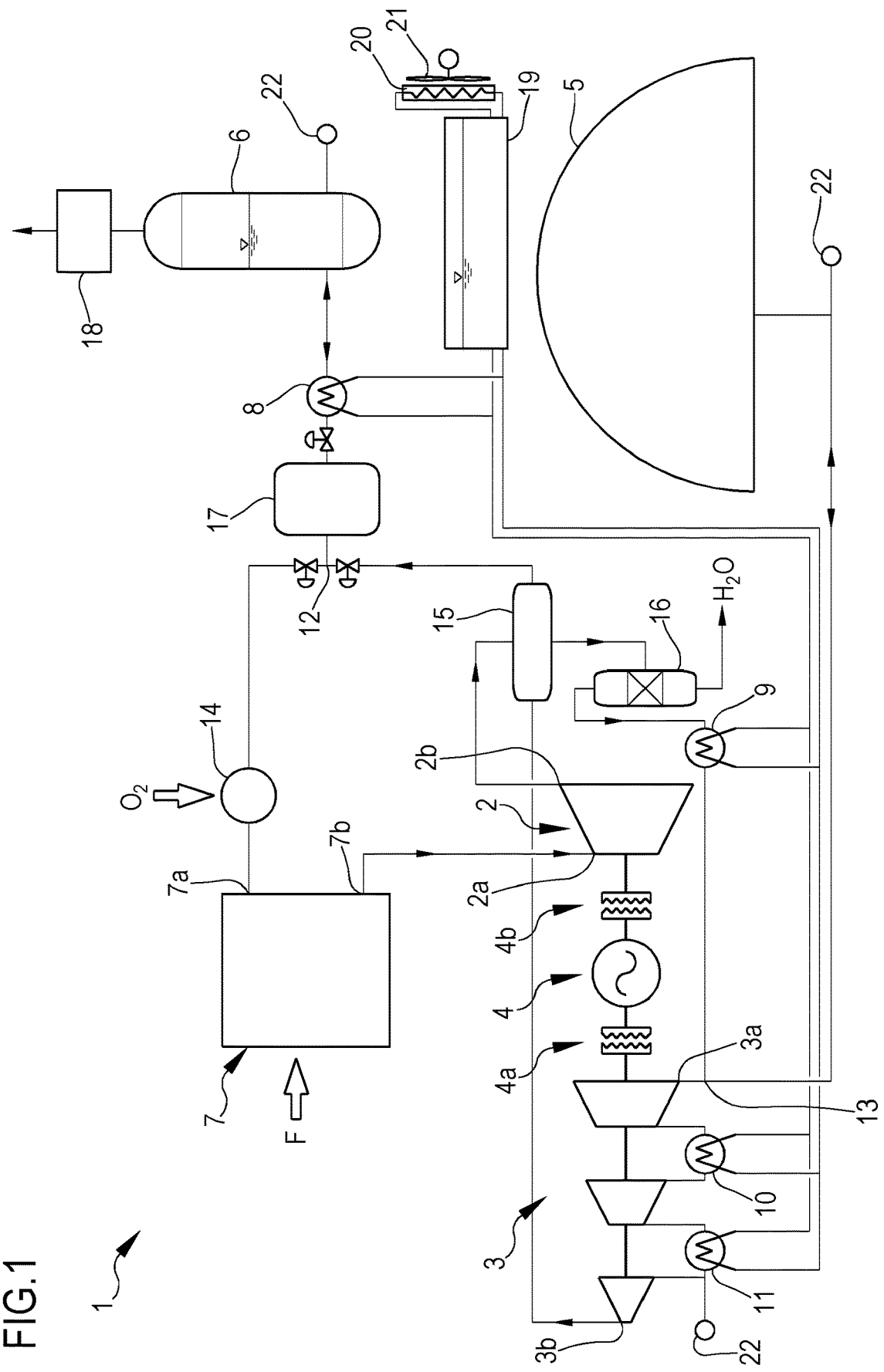
FIG. 1 schematically illustrates an embodiment of a plant for energy management according to the present invention.

With reference to FIG. 1, the plant 1 comprises an expander defined by a turbine 2, configured to expand the working fluid, and a compressor 3 of rotary type (turbocharger), configured to compress the working fluid. The compressor 3 is schematically illustrated as comprising three stages.

The compressor 3 and the turbine 2 are connected to a same motor generator 4 by means of respective transmissions, for example by means of connection devices 4A, 4B, e.g. of friction type, which allow connecting and disconnecting upon command the turbine 2 and/or the compressor 3 to/from the motor generator 4.

The plant 1 comprises a casing 5 preferably defined by a pressure-balloon made of flexible material, for example made of PVC coated polyester fabric. The pressure-balloon is preferably arranged on the surface and not in subterranean caverns, and is externally in contact with the atmospheric air. The pressure-balloon delimits, at its interior, a volume configured to contain the working fluid at atmospheric pressure or substantially atmospheric pressure, i.e. in equilibrium of pressure with the atmosphere. The casing 5 can also be made as a gasometer or any other storage system for gas at low or zero over-pressure.

The plant 1 comprises a tank 6 configured to store the working fluid in liquid or super-critical phase with a temperature close to its own critical temperature. The tank 6 is preferably made of metal, with an external wall of cylindrical form, as illustrated, or spherical form.

The plant 1 comprises a combustion chamber 7 configured to actuate an oxy-combustion and to heat the working fluid therewith and heat exchangers 8, 9, 10, 11 configured to transfer heat to the working fluid or to absorb heat from the working fluid.

Ducts, defined for example by a plurality of tubes, are operationally interposed between the casing 5 and the tank 6 and connect together, directly and/or indirectly, the casing 5, the tank 6, the compressor 3, the turbine 2, the combustion chamber 7 and the heat exchangers 8, 9, 10, 11.

The abovementioned ducts delimit a charge path which is extended from the casing 5 to the tank 6 and along which the compressor 3 and a first heat exchanger 8 are arranged in succession.

The abovementioned ducts delimit a discharge path which is extended from the tank 6 to the casing 5 and along which the first heat exchanger 8, the combustion chamber 7, the turbine 2 and a second heat exchanger 9 are arranged in succession.

The abovementioned ducts also delimit a closed circuit in fluid communication with the discharge path and with the charge path and consisting of the abovementioned combustion chamber 7, the abovementioned turbine 2, the abovementioned second heat exchanger 9, the abovementioned compressor 3.

The combustion chamber 7 is operationally active in the closed circuit and along the discharge path in order to heat the working fluid by means of an oxy-combustion within the closed thermodynamic cycle and the closed cyclic thermodynamic transformation during charging.

In embodiment variants, not illustrated in detail, the combustion chamber 7 is part of a turbomachine which comprises the abovementioned turbine 2 and the turbocharger 3. For example, the combustion chamber 7 is annular and is situated around a shaft which connects the turbine 2 to the compressor 3. Also in this case, passages and/or ducts are present which connect together the compressor 3, the turbine 2 and the combustion chamber 7.

A third and a fourth heat exchanger 10, 11 are interposed between the stages of the compressor 3 in order to actuate an inter-cooled compression.

According to that illustrated in FIG. 1, a first section of the ducts is extended between the casing 5 and an inlet 3a of the compressor 3. A second section is extended between an outlet 3b of the compressor 3 and an inlet 7a of the combustion chamber 7. On the second section, a first connector 12 is arranged, from which a third section of the ducts departs which is connected to the tank 6. A fourth section is extended between an outlet 7b of the combustion chamber 7 and an inlet 2a of the turbine 2. A fifth section is extended between an outlet 2b of the turbine 2 and a second connector 13 arranged on the first section at the inlet 3a of the compressor 3.

Between the first connector 12 and the inlet 7a of the combustion chamber 7, a mixer 14 is situated which has an inlet for the oxygen $O_2$ necessary for the oxy-combustion. The working fluid that transits in the ducts passes through the mixer 14 and here it is mixed with the oxygen $O_2$ before entering into the combustion chamber 7. In non-illustrated embodiment variants, the fuel F is introduced into the mixer together with the oxygen $O_2$ or fuel F and oxygen $O_2$ are introduced, together or separately, in one or more points of the closed circuit, for example by means of respective mixers.

Figure 4:
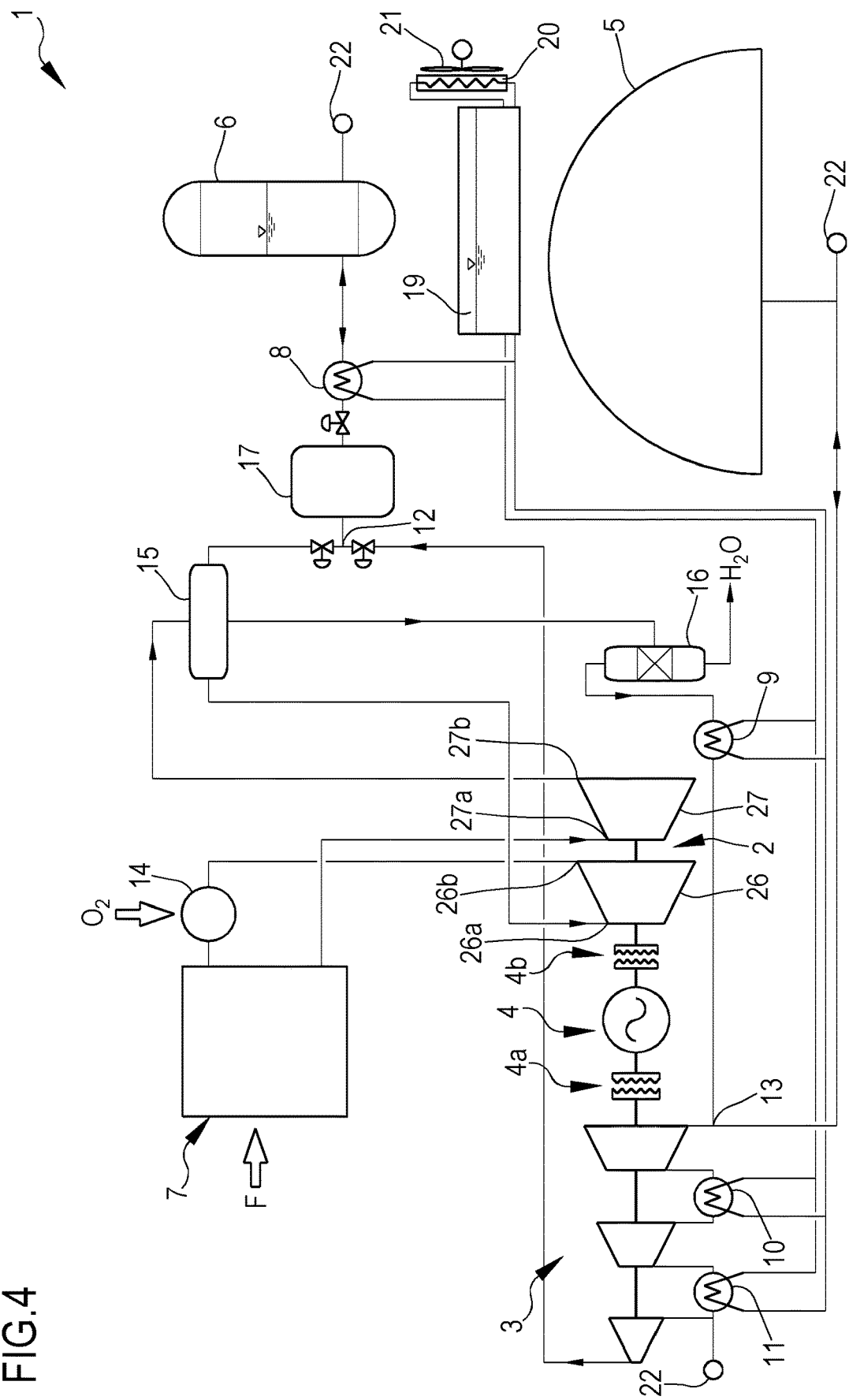
FIG. 4 is a further variant of the plant of FIG. 1.

In FIG. 4 the combustion chamber has an inlet for a fuel F, such as for example methane or other products containing carbon. In embodiment variants, the fuel comprises products containing nitrogen, such as ammonia $NH_3$ and/or hydrazine and/or urea. In the combustion chamber 7, the fuel F and the oxygen $O_2$ give rise to an exothermic reaction which produces heat, carbon dioxide and other products. For example: $CH_4 + 2\ O_2 = CO_2 + 2\ H_2O + Heat$. The heat heats the working fluid and the carbon dioxide and further substances, result of the combustion, are mixed with the working fluid (comprising or constituted by carbon dioxide) which transits in the combustion chamber 7.

In the case of oxy-combustion of nitrogenous synthetic products or hydrogen-based products (without carbon) also coming from processes which use renewable energy, such as for example $NH_3$ and/or Hydrazine and/or urea, the reactions will be the following:

$$2NH_3 + 2O_2 \rightarrow 3H_2O + N_2O$$

$$4NH_3 + 3O_2 \rightarrow 6H_2O + 2N_2$$

$$4NH_3 + 5O_2 \rightarrow 6H_2O + 4NO$$

$$4NH3 + 7O_2 \rightarrow 6H_2O + 4NO_2$$

and more generically:

$$XNH_3 + yN_2H_4 + kCH_4N_2O + zO_2 \rightarrow aH_2O + bN_2 + cNnOm + dCiOj$$

Preferably, it is provided that the oxy-combustion occurs with an excess of fuel or of oxygen, so that a part of the fuel or of the oxygen becomes part of the working fluid and circulates in the ducts. In the case of use of fuel F with $CH_4$ and production of $CO_2$, it is preferable to have an excess of oxygen.

A recuperator 15 is operationally active on the closed circuit to recover heat from the working fluid exiting from the turbine 2 and transfer it to the working fluid entering the combustion chamber 7. In FIG. 1, the recuperator 15 is situated on the second section between the outlet 3b of the compressor 3 and the first connector 12. The recuperator 15 is also situated on the fifth section, between the outlet 2b of the turbine 2 and the second heat exchanger 9 which is placed on said fifth section.

In addition, on the fifth section, between the recuperator 15 and the second heat exchanger 9, a separator 16 of carbon dioxide is positioned, configured to separate carbon dioxide from other products of the oxy-combustion, such as for example water, and extracting the latter from the ducts, i.e. from the process.

On the third section, the first heat exchanger 8 and a thermal accumulator 17 (Thermal Energy Storage TES) are also arranged. The thermal accumulator 17 is positioned between the first heat exchanger 8 and the first connector 12.

A device 18 for the extraction of non-condensable gases (NCG) of continuous or batch operating type (as a function of what will be used as fuel) is also connected to the tank 6.

The plant 1 also comprises a water circuit comprising a tub 19 in equilibrium with the atmospheric pressure and ducts which connect the tub 19 to the first, second, third and fourth heat exchanger 8, 9, 10, 11. The abovementioned tub 19 is also coupled to a radiator 20 provided with one or more suckers 21 placed on a recirculation duct which, for example, cools the water during the night and heats it during the day.

Introduction/extraction ducts 22 (schematized in FIG. 1) in fluid communication with the ducts and/or with the tank 6 and/or with the casing 5 are provided in order to allow introducing the working fluid in the plant 1 in a controlled manner. The same ducts 22 can also be used to extract the working fluid from the plant in a controlled manner. Said ducts 22 are for example connected to a system of capture and sequestration of the carbon dioxide.

The plant 1 also comprises a plurality of valves operationally situated on the ducts and a control unit, not illustrated, operationally connected to the different elements of the plant 1 itself and configured/programmed for managing the operation thereof.

Figure 2:
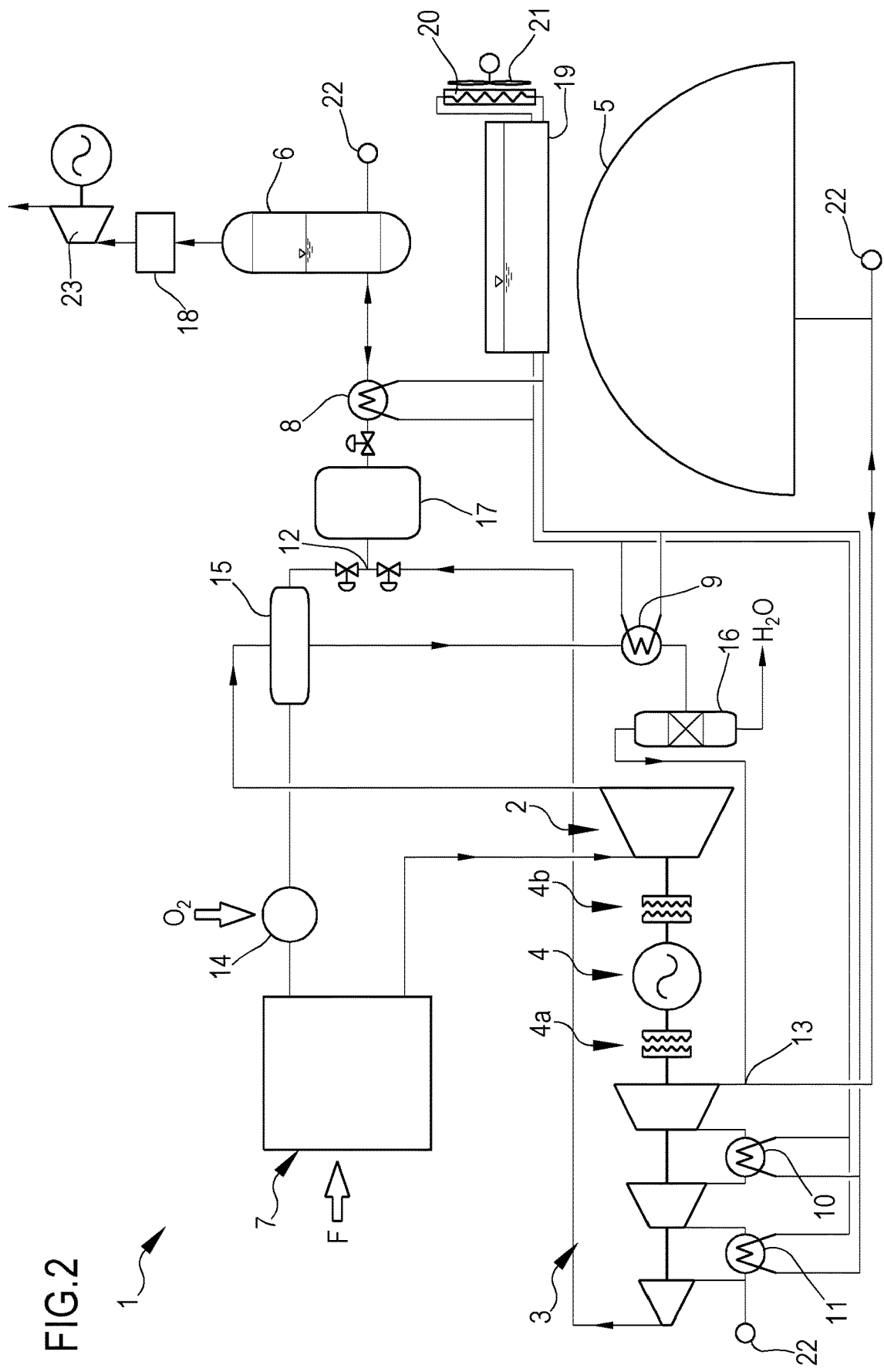
FIG. 2 is a variant of the plant of FIG. 1.

The variant of FIG. 2 differs from FIG. 1 since the recuperator 15 is situated on the second section between the first connector 12 and the mixer 14 instead of between the outlet 3b of the compressor 3 and the first connector 12. In addition, the carbon dioxide separator 16 is placed on the fifth section between the second heat exchanger 9 and the second connector 13 instead of between the recuperator 15 and the second heat exchanger 9. Finally, the device 18 for the extraction of non-condensable gases (NCG) is provided with an expander 23 of the non-condensable gases connected to a respective generator. The device 18 for the extraction of non-condensable gases (NCG) can be provided with a heater and/or a cooler (in order to increase the condensation efficiency). The non-condensable gases NCG, if not harmful for the environment, can be expelled directly into atmosphere or through an expander (with independent generator or connected to the rotary machines already present in the system, or which drives an operating machine useful or not useful for the system). Such non-condensable gases NCG can also be preheated before the expansion step in order to prevent reaching cryogenic temperatures. Alternatively, the non-condensable gases NCG can be delivered to an external system for a treatment/storage. The device 18 for the extraction of non-condensable gases (NCG) allows extracting components with molecular weight lower than the working fluid (such as $N_2$, NO, $NO_2$), extractible from the non-condensable gas system.

Figure 2A:
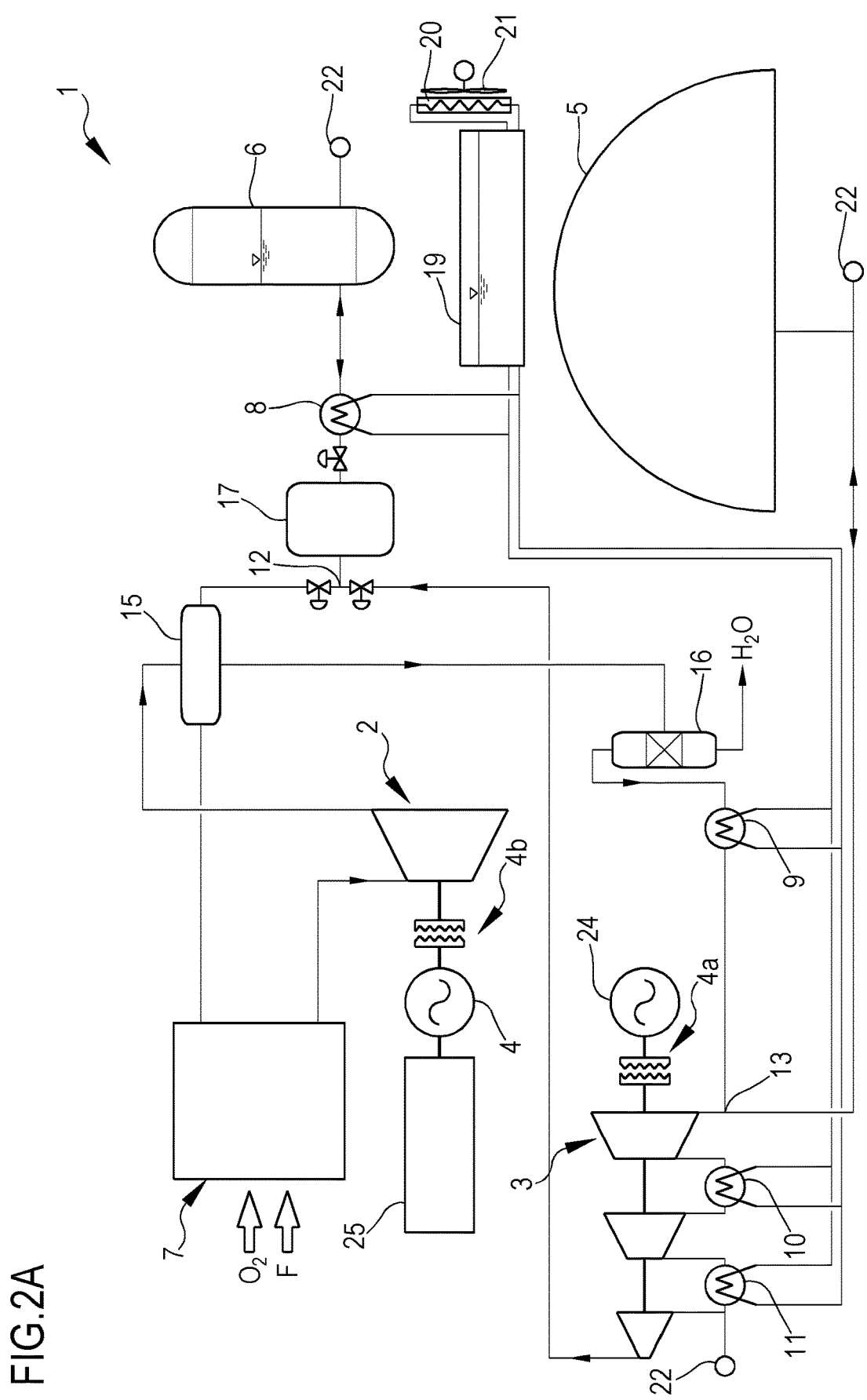
FIG. 2A is a further variant of the plant of FIG. 1.

The variant of FIG. 2A differs from FIG. 1 since, as in FIG. 2, the recuperator 15 is situated on the second section between the first connector 12 and the mixer 14 instead of between the outlet 3b of the compressor 3 and the first connector 12.

In addition, the compressor 3 is connected to an electric motor 24 and the turbine 2 is mechanically connected to a motor generator 4, with a friction element 4B interposed, and to a driven/operating machine 25, e.g. a machine train for air division.

A further variant, not illustrated, differs from FIG. 1 only because the recuperator 15 is situated on the second section between the first connector 12 and the mixer 14 instead of between the outlet 3b of the compressor 3 and the first connector 12.

The plant 1 is configured to operate in a charge configuration or in a discharge configuration, i.e. to execute a process comprising an energy charge phase and an energy generation and discharge phase (Cyclic thermodynamic transformation (CTT)).

The plant 1 is also configured to actuate the closed thermodynamic cycle (TC) in the closed circuit.

In the charge and discharge configurations, the operation of the plant is substantially that described in the patent application WO 2020/039416 on behalf of the same Applicant, except for the fact that the heat transmitted to the working fluid during the discharge is also and mainly provided by the oxy-combustion which occurs in the combustion chamber 7.

Figure 3A:
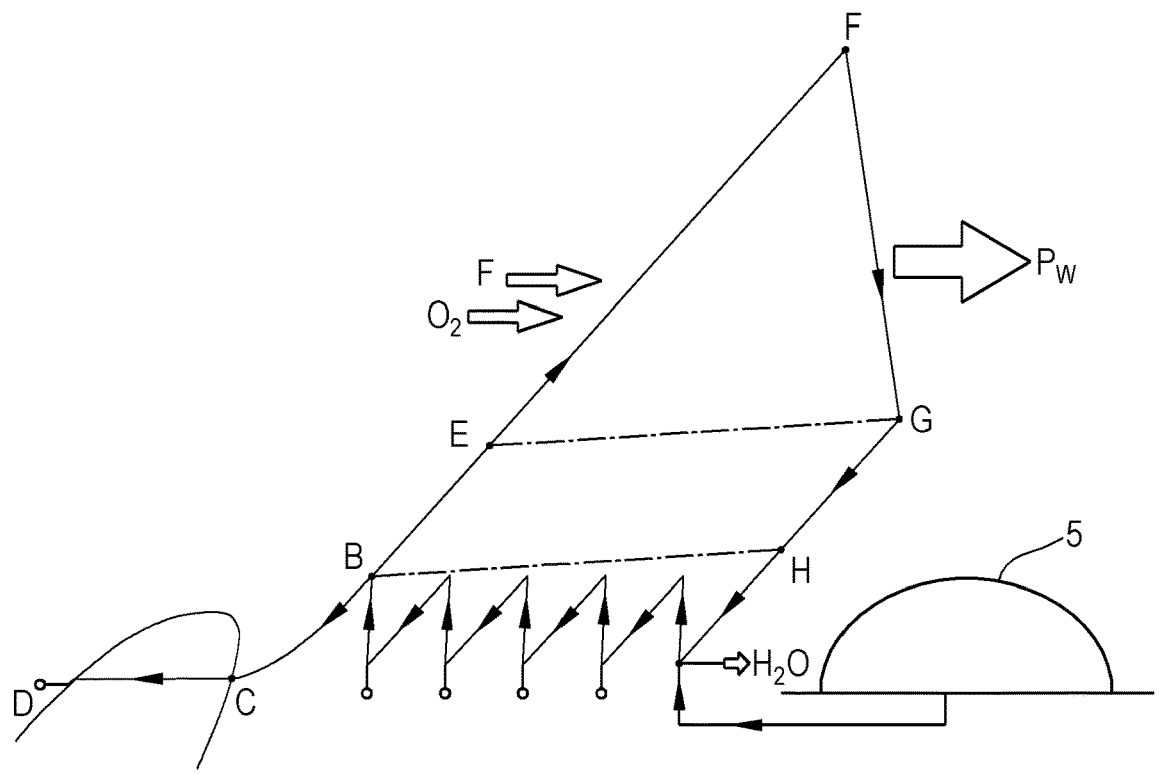
FIGS. 3A and 3B are diagrams T-S relative to the plants of FIGS. 1, 2 and 2A.

More in detail with reference to the embodiment of FIG. 2 and to the diagram of FIG. 3A, the working fluid ($CO_2$) in gaseous form is contained in the casing 5 at atmospheric pressure or substantially atmospheric pressure and at a temperature substantially equal to the ambient temperature (point A of the diagram T-S of FIG. 3A). The casing 5, by means of the valves, is placed in communication with the inlet 3a of the compressor 3. In addition, by means of the valves, the thermal accumulator 17 is placed in fluid communication with the outlet 3b of the compressor 3. The motor generator 4 actuates the compressor 3 so as to compress the working fluid coming from the casing 5. The working fluid is compressed in the compressor 3 by means of an inter-cooled compression and is heated (from A to B of the diagram T-S of FIG. 3A).

By means of the control of the valves, a part of the working fluid (for example 70%) is directed towards the thermal accumulator 17 and the first heat exchanger 8 and another part (for example 30%) flows towards the mixer 14 and the combustion chamber 7.

The thermal accumulator 17 removes heat from the compressed working fluid, cooling it (point C of the diagram T-S of FIG. 3A) and accumulates the thermal energy removed from said working fluid. In point C, the working fluid is situated at a temperature lower than the critical temperature of said fluid and at a point on the right part of the Andrews curve or slightly outside the curve in slight overheating conditions. The abovementioned compression can be adiabatic, inter-cooled or isothermal.

The working fluid passes through the first heat exchanger 8 which removes further heat from the working fluid and accumulates further thermal energy and is accumulated in the tank 6. The working fluid crosses the saturated vapor zone up to reaching the liquid phase (point D of the diagram T-S of FIG. 3A). The tank 6 therefore accumulates the working fluid in liquid phase at a temperature lower than its own critical temperature Tc. In this second state, the working fluid ($CO_2$, Tc=31° C.) in liquid form, for example at 20° C., is contained in the tank 6. The thermal accumulator 17 and the first heat exchanger 8 are therefore configured to operate a sub-critical transformation of the working fluid such that said working fluid is accumulated in the tank 6 in liquid phase. The device 18 for the extraction of non-condensable gases (NCG) provides for eliminating the NCGs from the tank 6.

For example, a temperature of the working fluid ($CO_2$) accumulated in the tank 6 is 24° C. and a pressure of the working fluid accumulated in the tank 6 is 65 bar. The density of the $CO_2$ at 25° C. and at atmospheric pressure is about 1.8 kg/m$^3$. The density of the $CO_2$ in the tank 6 is about 730 kg/m$^3$. The ratio between the density of the working fluid when it is contained in the tank 6 in the above-indicated conditions and the density of the same working fluid when it is contained in the casing 5 at atmospheric conditions is therefore about 400. On such matter it is observed that if in place of $CO_2$, atmospheric air is used that is stored at 65 bar and 24° C. in the tank 6, its density would only be 78 kg/m$^3$ and the volume of the tank 6 theoretically necessary would be about ten times higher.

In embodiment variants, not illustrated in detail, provision is made for removing heat from the working fluid, bringing it into super-critical phase and making it follow the right part of the Andrews curve.

The part of the working fluid (30%) that operates according to the closed thermodynamic cycle (TC) is preheated in the recuperator 15 (point E of the diagram T-S of FIG. 3A) and then heated by means of the oxy-combustion in the combustion chamber 7 (point F of the diagram T-S of FIG. 3A), then enters into the turbine 2 where it is expanded and is cooled (up to point G of the diagram T-S of FIG. 3A). The turbine 2 transforms the energy of the working fluid into electrical energy/power Pw (FIGS. 1 and 2) and/or mechanical energy/power (FIG. 2A).

The part of the working fluid is then cooled first in the recuperator 15 (up to point H of the diagram T-S of FIG. 3A) and then in the second heat exchanger 9 (and reported at point A of the diagram T-S of FIG. 3A).

In the separator 16, the products of the oxy-combustion like water are separated from carbon dioxide and extracted from the plant at the appropriate position along the ducts and/or from the tanks at high pressure. The working fluid is re-introduced into the compressor 3 in order to re-initiate the closed thermodynamic cycle (TC).

Figure 3B:
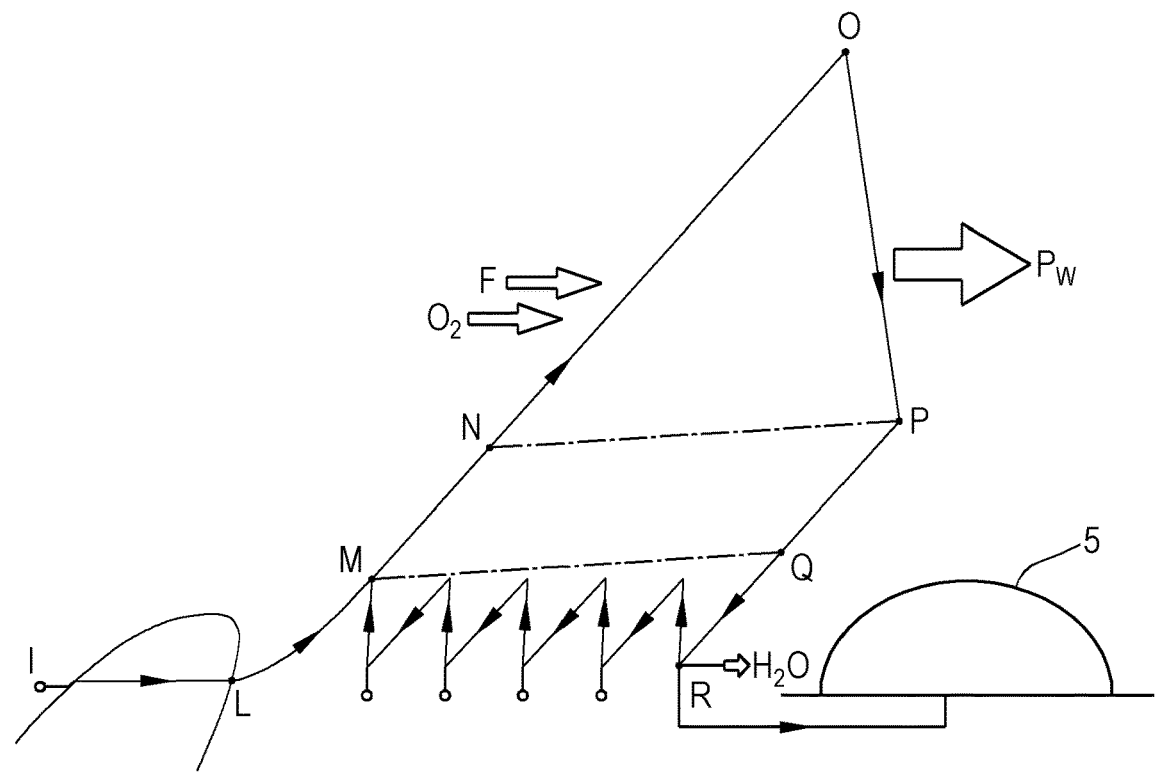

The diagram of FIG. 3B illustrates a discharge configuration/phase with simultaneous closed thermodynamic cycle (TC).

The plant 1 departs from the second state (point I of the diagram T-S of FIG. 3B). The casing 5, by means of the valves, is placed in communication with the outlet 2b of the turbine 2. In addition, by means of the valves, the thermal accumulator 17 and the first heat exchanger 8 are placed in fluid communication with the inlet 2a of the turbine 2.

The first heat exchanger 8 transfers part of the heat, previously accumulated in the charge configuration, to the working fluid exiting from the tank 6. The exchanger 8 is capable, through the tub 19 of water, of transferring the heat coming from the environment, exploiting the effects of "temperature swing" between day and night. In this manner, one obtains an evaporation pressure higher than the condensation pressure, thus increasing the RTE efficiency.

The working fluid crosses the saturated vapor zone up to reaching the vapor phase (point L of the diagram T-S of FIG. 3B). The working fluid crosses the thermal accumulator 17 which transfers further heat, previously accumulated in the charge configuration, to the working fluid and heats it (point M of the diagram T-S of FIG. 3B).

The working fluid then crosses the recuperator 15 (point N of the diagram T-S of FIG. 3B) and then it is heated (up to point O of the diagram T-S of FIG. 3B) in the combustion chamber 7.

The heated working fluid enters into the turbine 2, is expanded and is cooled (point P of the diagram T-S of FIG. 3B) and determines the rotation of the turbine 2 which generates electrical and/or mechanical energy/power Pw. The expansion of the working fluid in the turbine 2 can be adiabatic, inter-heated or isothermal.

The working fluid exiting from the turbine 2 is cooled in the recuperator 15 (point Q of the diagram T-S of FIG. 3B) and then in the second heat exchanger 9 (point R of the diagram T-S of FIG. 3B).

At this point, by means of the control of the valves, a part of the working fluid (for example 70%) is directed towards the casing 5 and returns into the casing 5 at atmospheric pressure or substantially atmospheric pressure. Another part (for example 30%) is sent to the compressor 2 in order to execute the closed thermodynamic cycle (points R-M-N-O-P-Q-R of FIG. 3B or points A-B-E-F-G-H-A of FIG. 3A) described above.

The additional carbon dioxide $CO_2$ produced by the oxy-combustion in the combustion chamber 7 becomes part of the closed cyclic thermodynamic transformation (CTT) and/or of the closed thermodynamic cycle (TC). All or part of the excess carbon dioxide $CO_2$ can be extracted in a controlled manner from the plant through the introduction/extraction ducts 22. The excess $CO_2$ can exit from the plant also at separate times due to the accumulations available to the plant. The water is separated and extracted through the separator 16. The non-condensable gases NCG are extracted through the device 18 for the extraction of non-condensable gases.

The plant 1 allows generating electrical energy with a system that "burns" fuel without introducing $CO_2$ into the atmosphere but rather storing it, for example in tanks or underground, e.g. through re-injection wells, and/or rendering it available for other uses.

The plant 1 also allows introducing, through said introduction/extraction ducts 22, carbon dioxide coming from other sources and using it as working fluid. For example, the introduced carbon dioxide derives from the gasification of biomasses or from industrial processes.

For example, the plant/process according to the present invention can be coupled/integrated with the plants/processes that transform minerals into more precious and non-ferrous materials (e.g. aluminum or nickel alloys) by means of reductions/oxidation-reductions. Such processes give, as final result, a gas mixture which can be used in the plant/process, object of the invention, as fuel.

One example is the possibility to use, as fuel, the blast furnace outlet gas (e.g. for production of cast iron starting from minerals) termed BFG (Blast Furnace Gas). Such gas is mainly composed of 5% $H_2$, 20% CO, 25% $CO_2$ and 50% $N_2$. According to a different example, it is possible to use as fuel the gas LDG mainly composed of 60% CO, 10-15% $N_2$ and the rest $CO_2$, which is the gas exiting from the cast iron-steel converter.

The variant of FIG. 4 differs from FIG. 1 since the expander comprises a turbine 26 at high pressure and turbine 27 at low pressure connected in series. The combustion chamber 7 with the mixer 14 is operationally interposed between an outlet 26$b$ of the turbine 26 at high pressure and an inlet 27$a$ of the turbine 27 at low pressure. The recuperator 15 is situated on the second section between the first connector 12 and an inlet 26$a$ of the turbine 26 at high pressure. An outlet 27$b$ of the turbine 27 at low pressure is connected to the second connector 13. The turbines can be of the same or different technology (axial, radial etc.).

Figure 5:
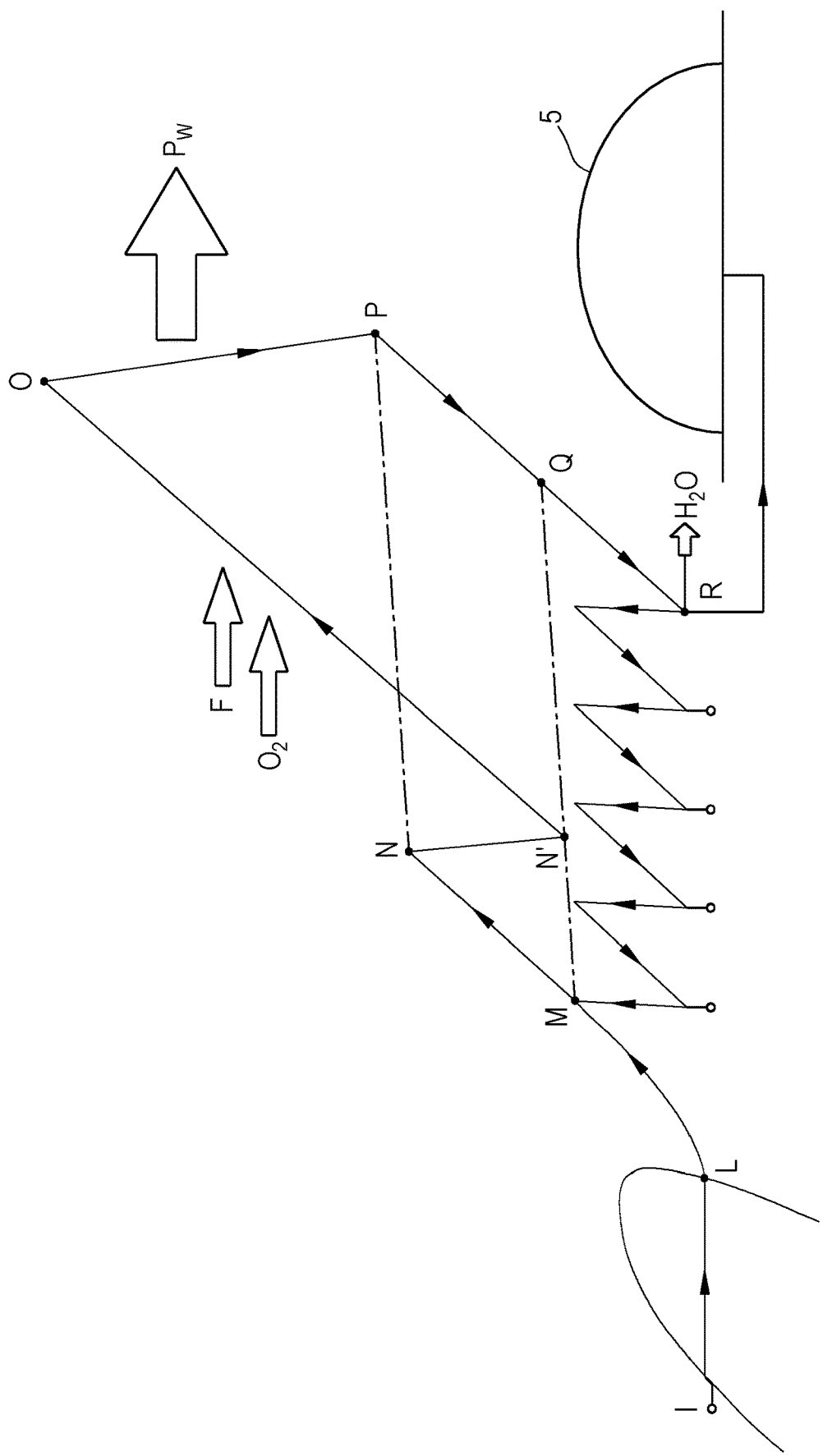
FIG. 5 is a diagram T-S relative to the plant of FIG. 4.

The diagram of FIG. 5 illustrates the discharge configuration/phase with simultaneous closed thermodynamic cycle (TC) and differs from the diagram of FIG. 3B due to the presence of the expansion N—N' in the turbine 26 at high pressure.

Figure 6:
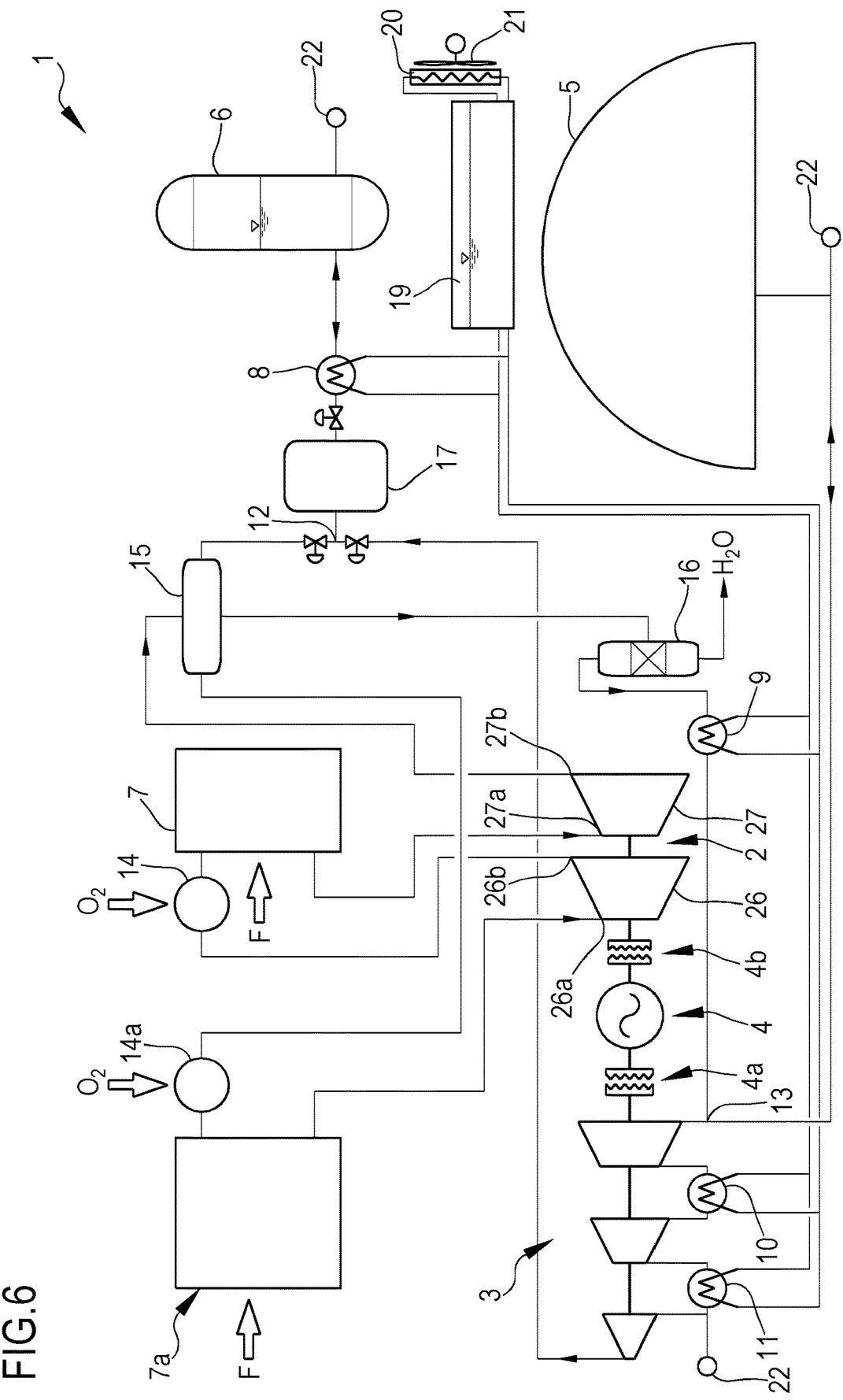
FIG. 6 is a further variant of the plant of FIG. 1.

The variant of FIG. 6 differs from FIG. 4 due to the presence of a second combustion chamber 7$a$ (reheat) with relative mixer 14$a$ interposed between the recuperator 15 and the inlet 26$a$ of the turbine 26 at high pressure.

Figure 7:
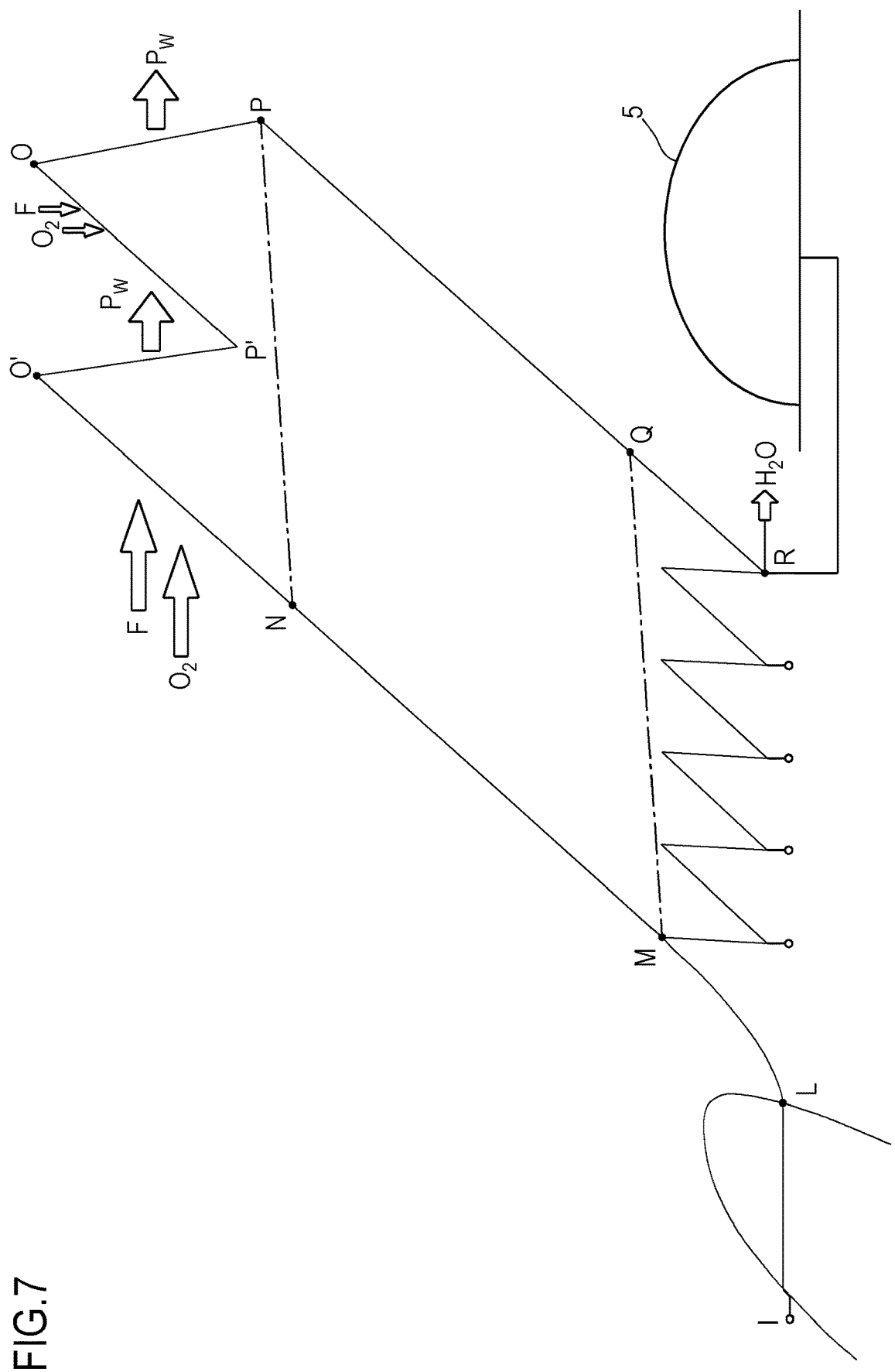
FIG. 7 is a diagram T-S relative to the plant of FIG. 6.
Figure 8:
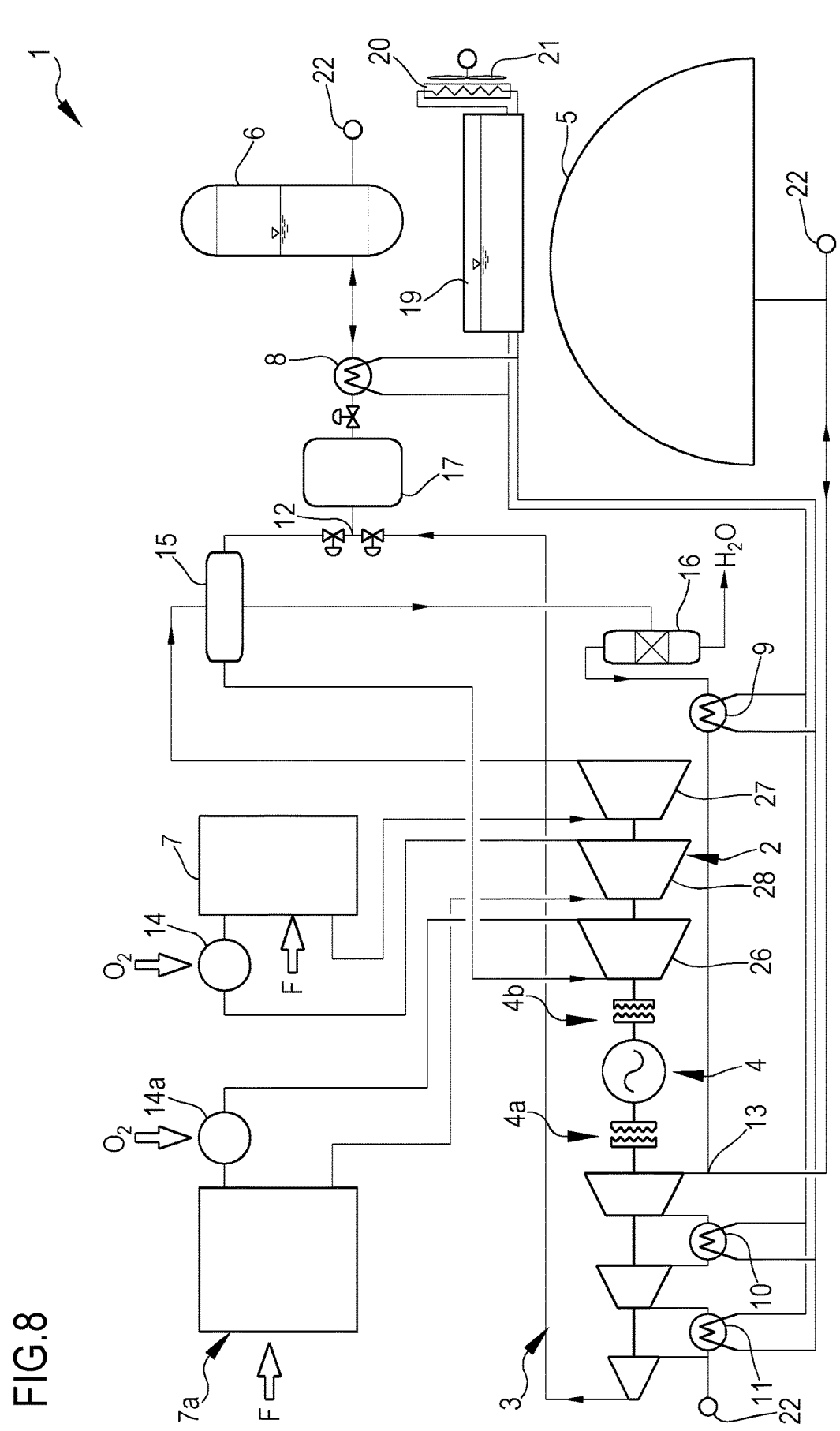
FIG. 8 is a further variant of the plant of FIG. 1.

The diagram of FIG. 7 illustrates the discharge configuration/phase with simultaneous closed thermodynamic cycle (TC) and differs from the diagram of FIG. 3B due to the presence of the double oxy-combustion N—O' and P'—O and of the double expansion O'—P' and O—P in the turbine 26, 27 at high and low pressure. The variant of FIG. 8 is a combination of those of FIGS. 4 and 6 with a turbine 26 at high pressure, a turbine 28 at medium pressure and a turbine 27 at low pressure in which the combustion chambers 7, 7$a$ with the relative mixers 14, 14$a$ are placed between the turbine 26 at high pressure and the turbine 28 at medium pressure and between the turbine 28 at medium pressure and the turbine 27 at low pressure.

Figure 9:
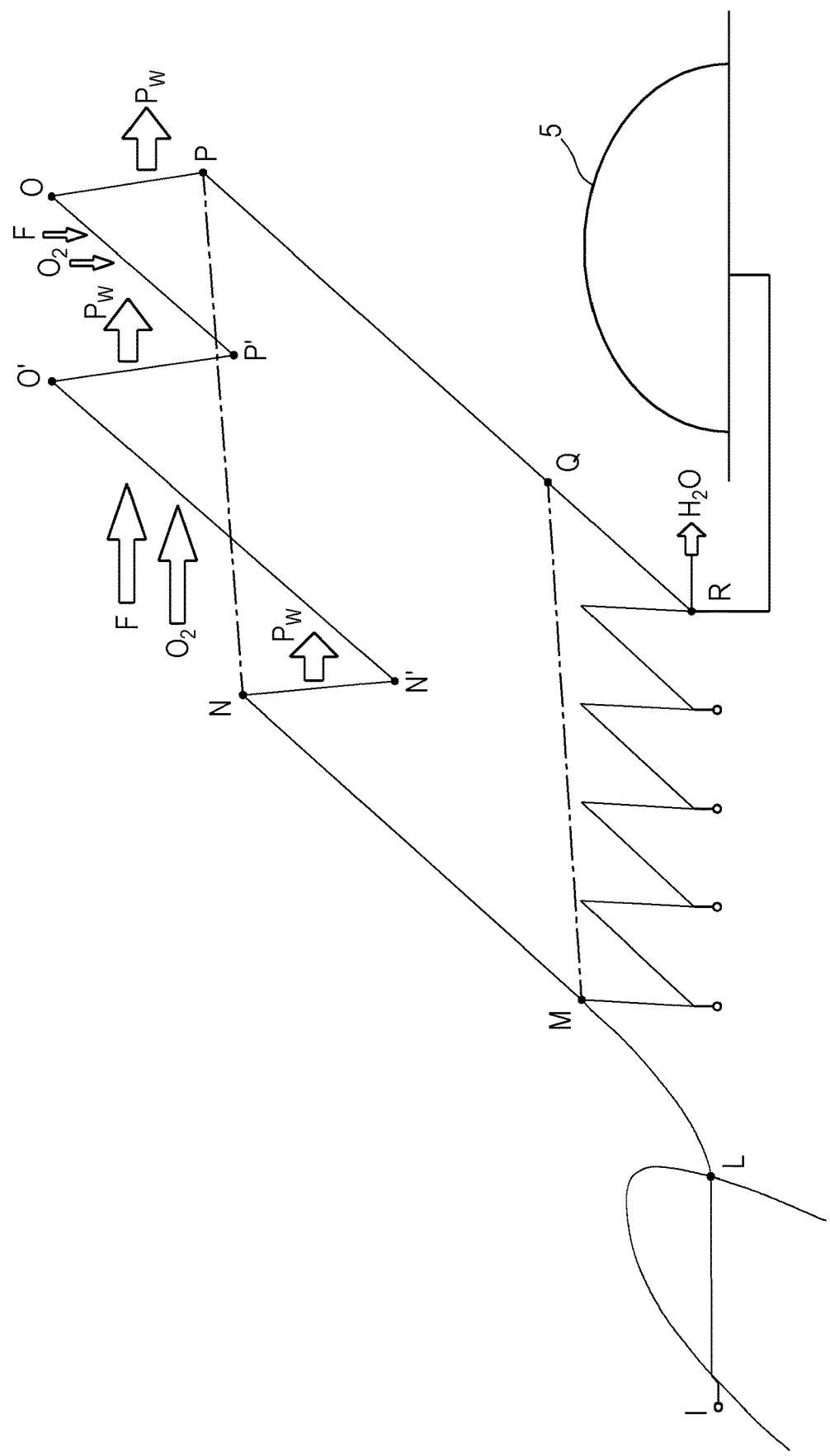
FIG. 9 is a diagram T-S relative to the plant of FIG. 8.
Figure 10:
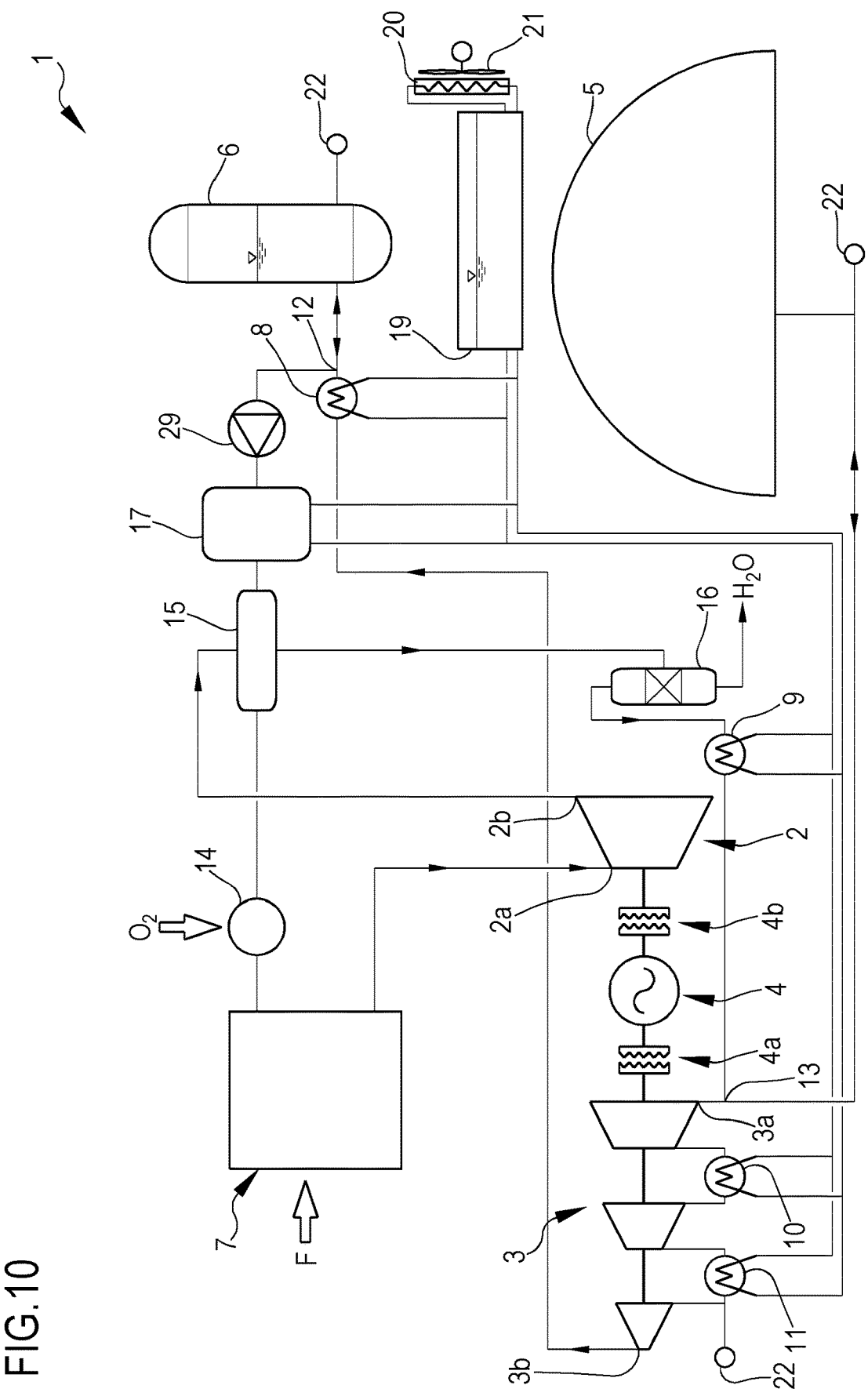
FIG. 10 is a further variant of the plant of FIG. 1.

The diagram of FIG. 9 illustrates the discharge configuration/phase with simultaneous closed thermodynamic cycle (TC) and has the expansion N—N' in the turbine 26 at high pressure, the double oxy-combustion N'—O' and P'—O and the double expansion O'—P' and O—P in the turbine 28, 27 at medium and low pressure. The variant of FIG. 10 differs from FIG. 1 since, as in FIG. 2, the recuperator 15 is situated on the second section between the first connector 12 and the mixer 14 instead of between the outlet 3$b$ of the compressor 3 and the first connector 12. In addition, a pump 29 is placed upstream of the mixer 14 and of the combustion chamber 7 in order to increase an inlet pressure in the turbine 2. In particular, the first connector 12, the first heat exchanger 8 and the thermal accumulator 17 have an arrangement different from that of FIG. 1. The first heat exchanger 8 is placed between the outlet 3$b$ of the compressor 3 and the first connector 12, the thermal accumulator 17 is placed between the first connector 12 and the mixer 14, the pump 29 is placed between the first connector 12 and the thermal accumulator 17. It follows that the first heat exchanger 8 works in accumulation and in the closed cycle and does not discharge while the thermal accumulator 17 and the pump 29 work in discharge and in the closed cycle but do not accumulate.

Figure 11:
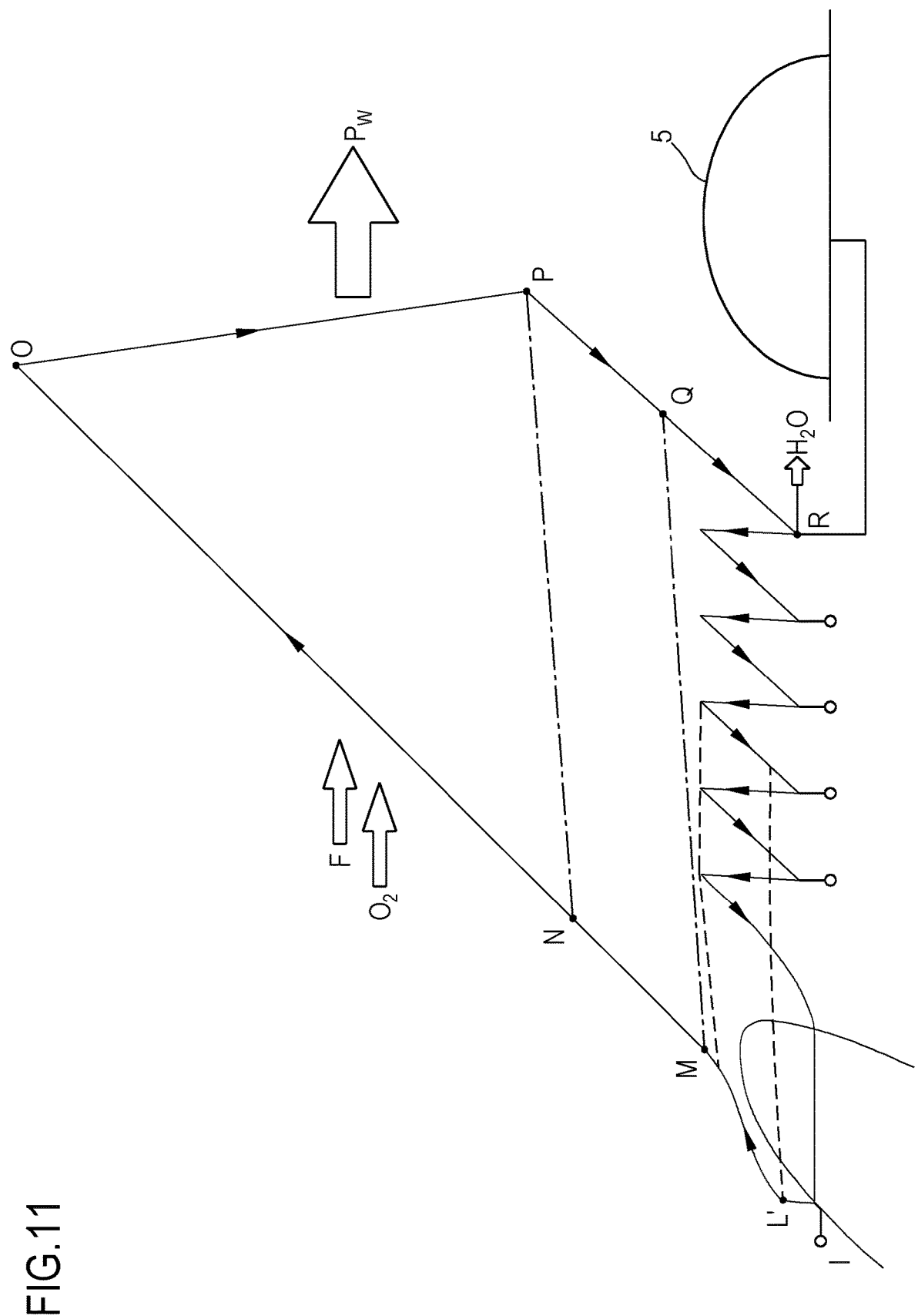
FIG. 11 is a diagram T-S relative to the plant of FIG. 10.

The diagram of FIG. 11 illustrates the discharge configuration/phase with simultaneous closed thermodynamic cycle (TC) and differs from the diagram of FIG. 3B due to the fact that the pump 29 increases the pressure (I-L') before the passage into the thermal accumulator 17 (L'-M). In the discharge phase, the working fluid is not made to evaporate once again since the working fluid is brought into supercritical condition with the pump. It is also possible to preheat the working fluid with heat accumulated in a thermal accumulator, using the heat extracted from the compression inter-coolings.

Figure 12:
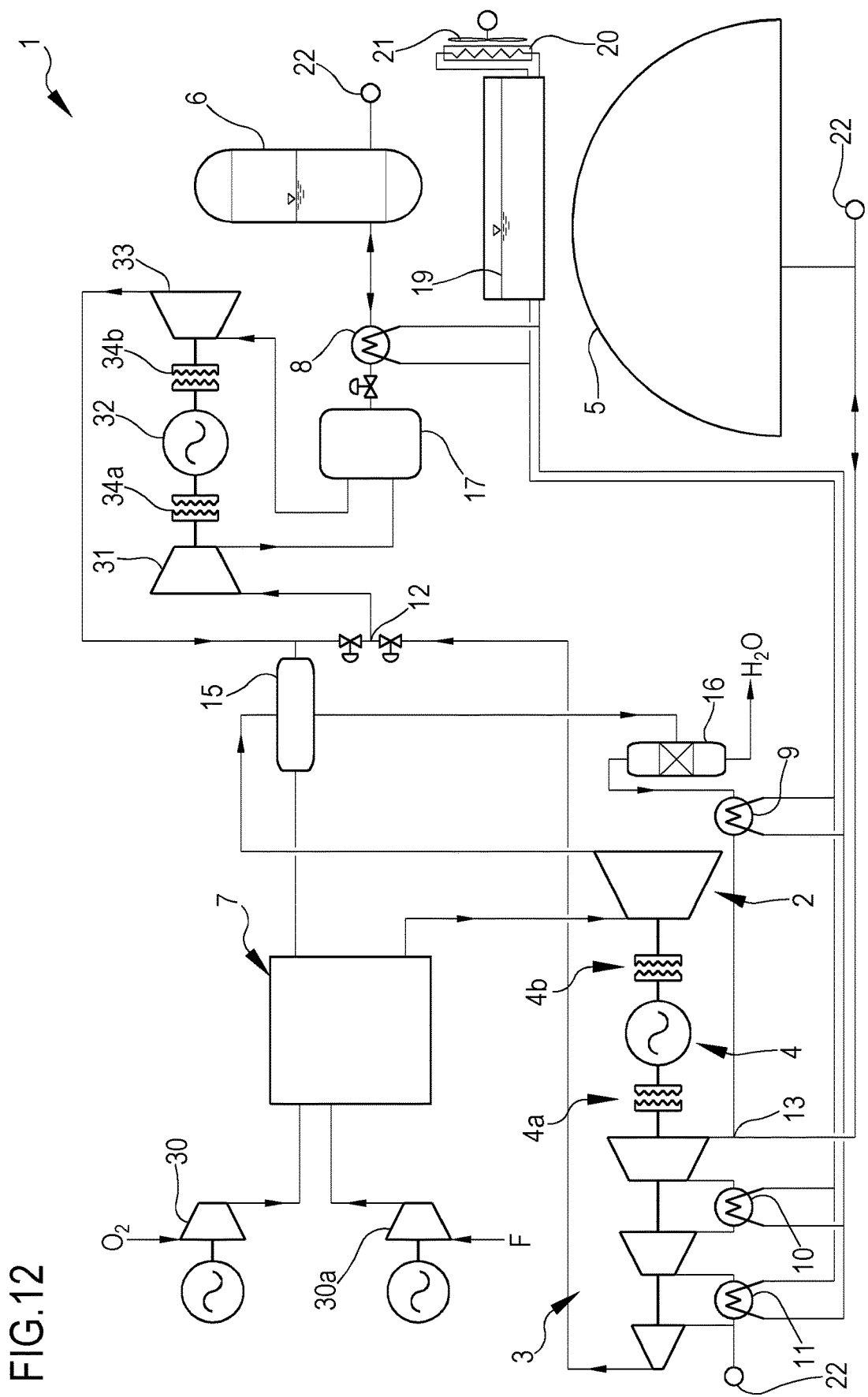
FIG. 12 is a further variant of the plant of FIG. 1.

The variant of FIG. 12 differs from FIG. 1 since, as in FIG. 2, the recuperator 15 is situated on the second section between the first connector 12 and the mixer 14 instead of between the outlet 3$b$ of the compressor 3 and the first connector 12. In addition, the oxygen $O_2$ is introduced directly into the combustion chamber 7 (no mixer is present) through a dedicated compressor 30 and also the fuel is introduced into the combustion chamber 7 through an auxiliary compressor 31.

The variant of FIG. 12 also comprises an additional machine comprising an auxiliary compressor 31 and an auxiliary turbine 33 mechanically connected to an auxiliary motor generator 32 by means of connection devices 34A, 34B of friction type. Such additional machine is connected to the ducts between the first connector 12 and the tank 6 and has the function of working the closed thermodynamic cycle between a maximum pressure and a minimum pressure in which the maximum pressure is lower than a condensation pressure. The condensation pressure is reached, due to the auxiliary compressor 31, by the part of working fluid that is accumulated in the tank 6 while the part that circulates in the closed circuit reaches a lower maximum pressure. For example, the closed thermodynamic cycle can work between a maximum pressure (e.g. between 5 bar and 45 bar) lower than a maximum pressure of the process, i.e. a storage pressure, and a minimum pressure (e.g. between 1 bar and 5 bar) greater than a minimum pressure of the process. Hence, the process comprises a recuperative cycle at medium-low temperature which can work independently from the second transformation, which increases the pressure up to reaching the conditions which allow the storage in liquid phase of the working fluid in the tank 6.

The auxiliary compressor 31 is arranged along the charge path between the first connector 12 and the thermal accumulator 17. The working fluid coming from the first connector 12 enters into the auxiliary compressor 31, is compressed and directed towards the thermal accumulator 17 and then through the first heat exchanger 8.

The auxiliary turbine 33 is arranged along the discharge path between the thermal accumulator 17 and the first connector 12. The working fluid coming from the tank 6, evaporated in the first heat exchanger 8 and heated in the thermal accumulator 17, enters into the auxiliary turbine 33, is expended, rotating the auxiliary turbine 33 and is directed towards the recuperator 15.

Figure 13:
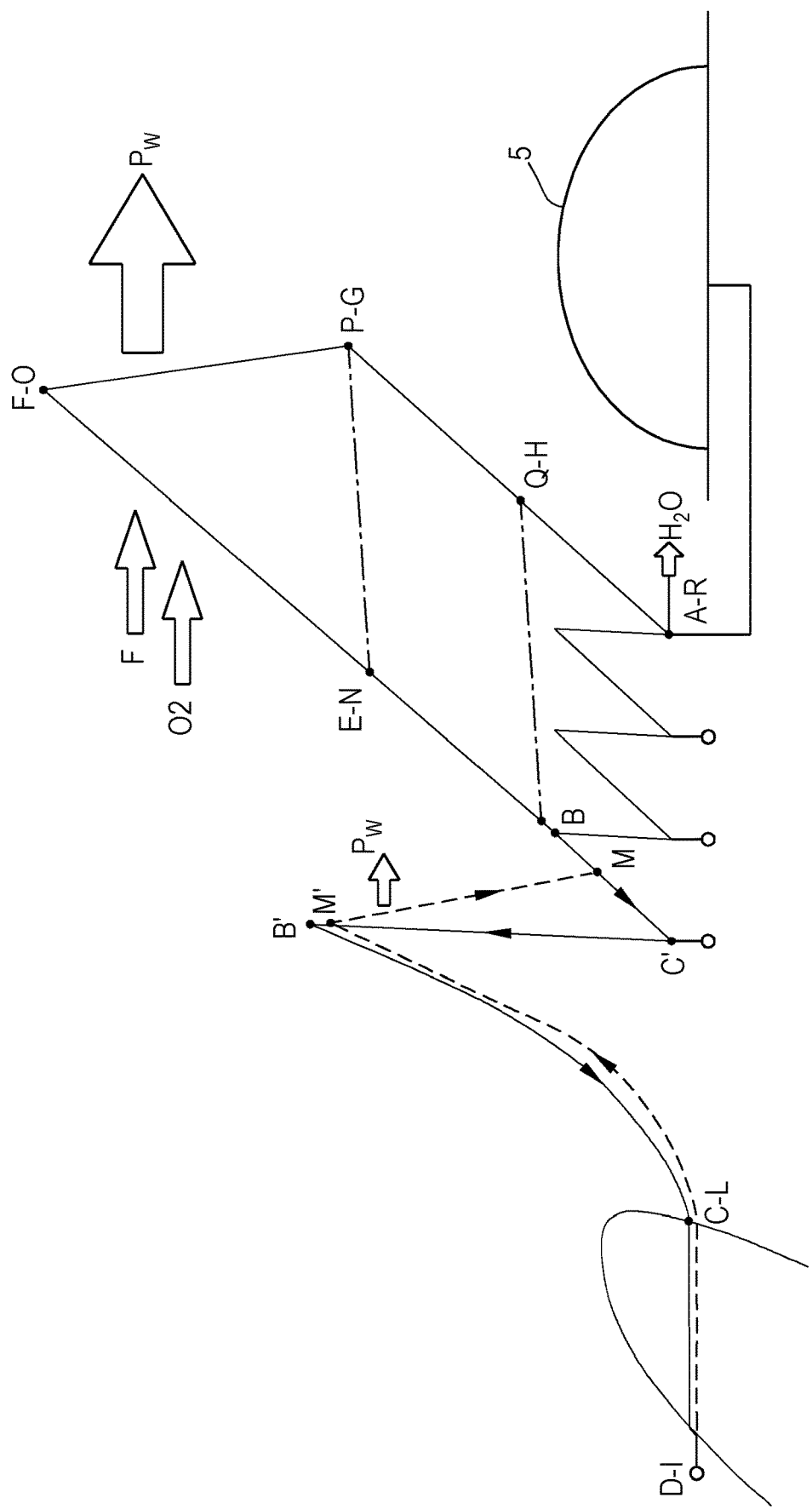
FIG. 13 is a diagram T-S relative to the plant of FIG. 11.

The diagram of FIG. 13 illustrates the phases of charge and discharge with simultaneous closed thermodynamic cycle (TC). During the charge phase, at the outlet of the compressor 3, the process is situated at point B. The system is then brought to point C' and the working fluid is then compressed in the auxiliary compressor 31 (diagram T-S from C' to B'). The working fluid crosses the accumulator 17 (from B' to C) and the first heat exchanger 8 (from C to D). The discharge phase is represented in the figure with a dashed line for a part. The working fluid that exits from the tank 6 passes into the first heat exchanger 8 (I-L) and into the thermal accumulator 17 (L-M'), is expanded in the auxiliary turbine 33 (M'-M) and then in the recuperator (M-N). The expansion of the working fluid in the auxiliary turbine 33 provides a return of energy after having been evaporated in the first heat exchanger 8 and preheated in the thermal accumulator 17.

During the expansion of the accumulated working fluid, the auxiliary compressor 31 might not operate and the recuperator 15 could exchange much heat if the temperature of the auxiliary turbine 33 is lower than the delivery temperature of the compressor 3.

Figure 14:
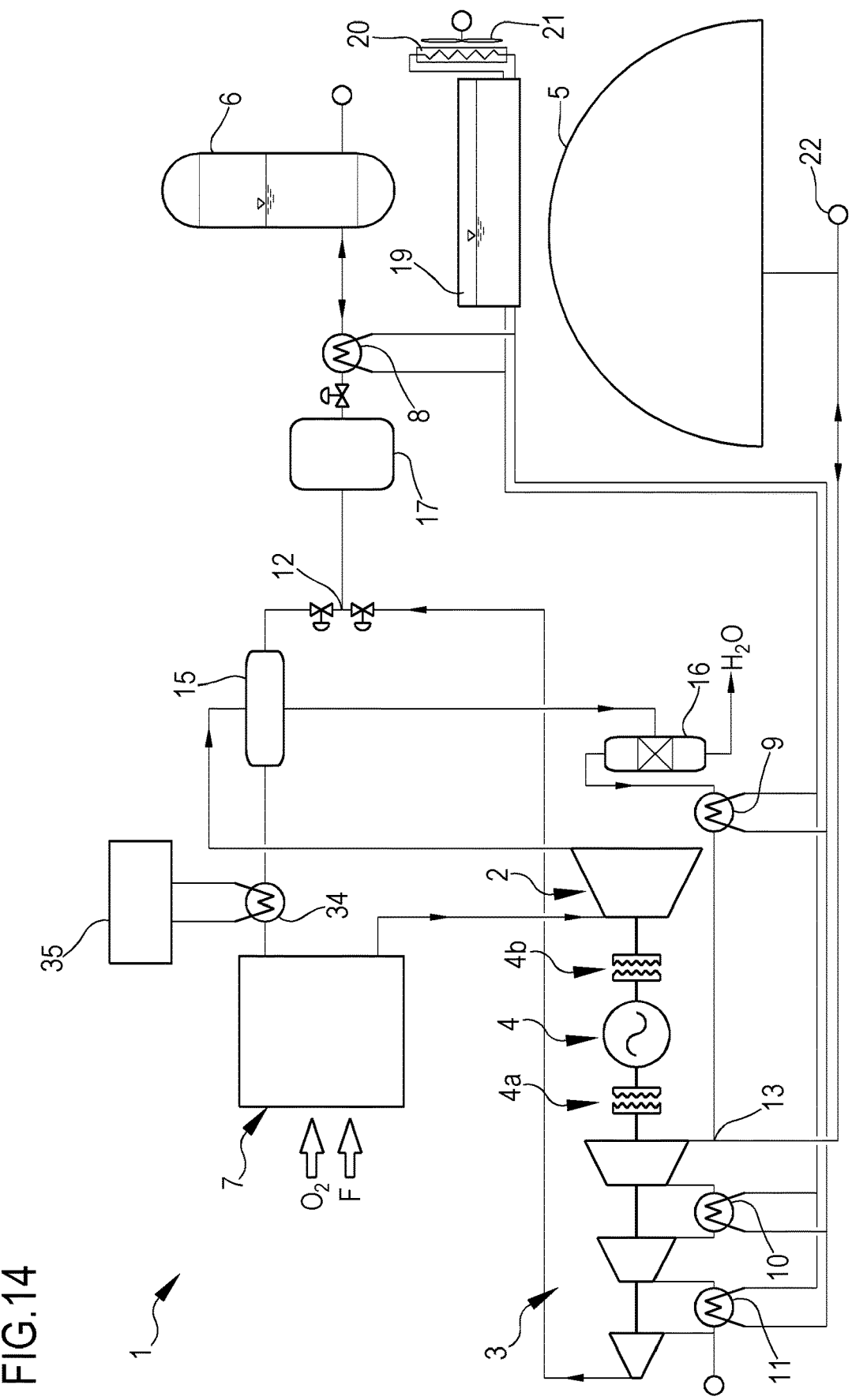
FIG. 14 is a further variant of the plant of FIG. 1.

The variant of FIG. 14 differs from FIG. 1 since, as in FIG. 2, the recuperator 15 is situated on the second section between the first connector 12 and the mixer 14 instead of between the outlet 3b of the compressor 3 and the first connector 12. In addition, the oxygen $O_2$ is introduced directly into the combustion chamber 7 (no mixer is present) as the fuel. In a non-illustrated variant, the oxygen is introduced into the combustion chamber 7 while the fuel is mixed upstream of the combustion chamber.

The variant of FIG. 14 also comprises a further heat exchanger 34 operationally associated with an additional external heat source 35, in order to receive heat from said additional external heat source 35. The further heat exchanger 34 is operationally placed on the discharge path between the recuperator 15 and the combustion chamber 7. The heat coming from outside is used to increase the temperature of the working fluid entering the combustion chamber 7 and increase the efficiency. For example, the additional external heat source 35 is a methanation plant dedicated to the conversion of hydrogen into Synthetic Natural Gas through the exothermic reaction $H+CO_2 \rightarrow CH_4+H_2O+heat$.

Figure 15:
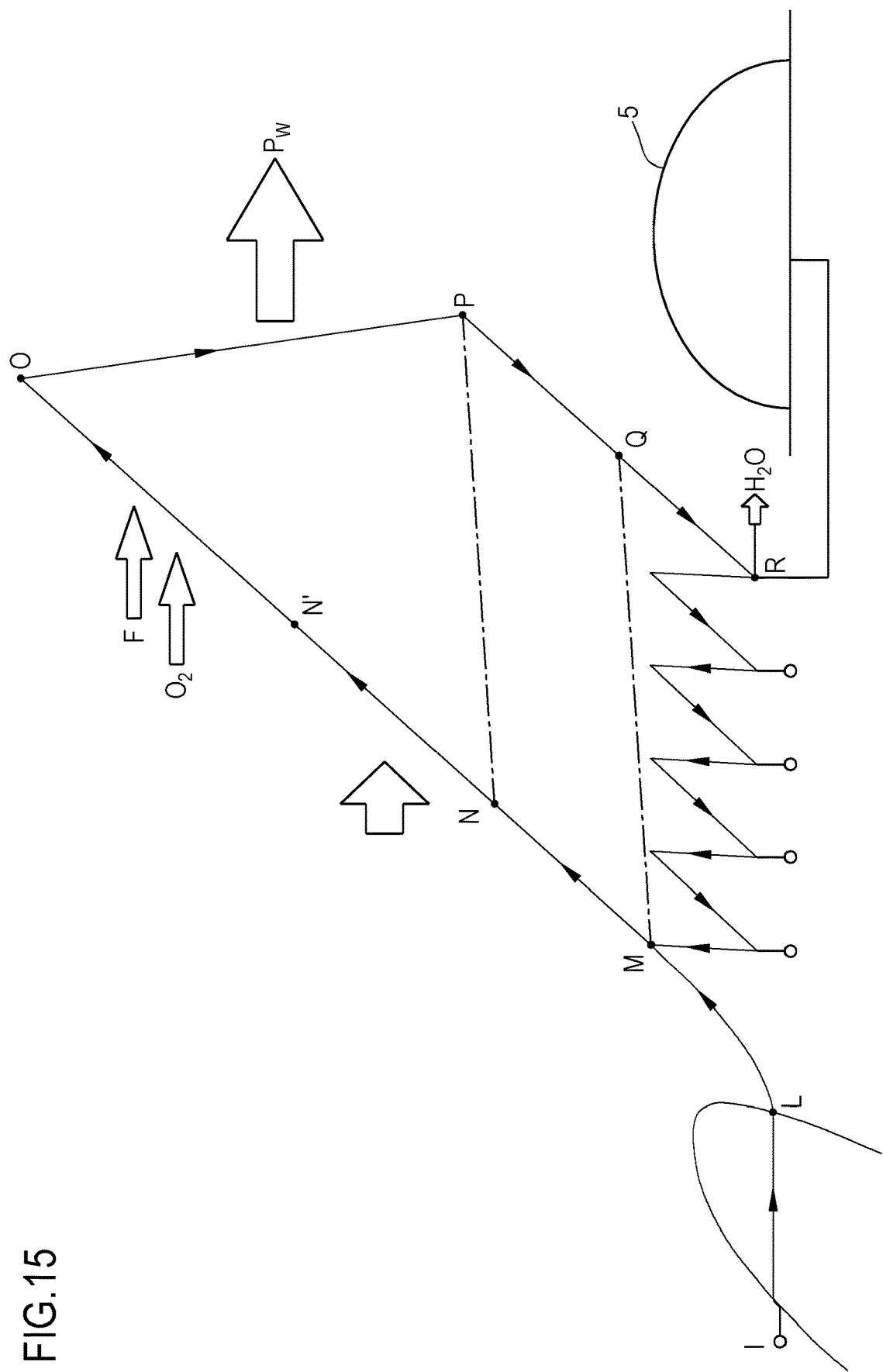
FIG. 15 is a diagram T-S relative to the plant of FIG. 14.

The diagram of FIG. 15 illustrates the discharge configuration/phase with simultaneous closed thermodynamic cycle (TC) and differs from the diagram of FIG. 3B due to the fact that after the heating in the recuperator 15 (M-N) and before the oxy-combustion (N'—O), the heating in the further heat exchanger 34 (N'—N) is presence.

The yield of the plant/process according to the invention can vary due to the use of energy stored in the accumulations (in the form of heat with TES and in the form of potential energy in pressure tanks).

Indeed, the system is characterized by:
  nominal yield: only the cycle operates;
  lower yield (also negative if energy is absorbed) in which the system for charging also operates;
  higher yield in which the cycle operates, discharging the energy storage.

The plant/process also allows extracting heat at low temperature, typically lower than 100° C., in order to supply external users or cooling circuits of the inter-coolers of the compressor or of the post-cooler of the turbine, i.e. the second heat exchanger 9.

The invention claimed is:
1. A plant for energy management, comprising:
    a working fluid other than atmospheric air;
    at least one casing configured to store the working fluid in gaseous phase and in equilibrium of pressure with the atmosphere;
    at least one tank configured to store the working fluid in liquid or super-critical phase with a temperature close to its own critical temperature;
    ducts operationally interposed between the casing and the tank and connecting, directly or indirectly, the casing with the tank, the ducts delimiting:
        at least one charge path extending from the casing to the tank,
        at least one discharge path extending from the tank to the casing, and
        at least one closed circuit in fluid communication with the discharge path and with the charge path;
    at least one expander arranged along the ducts and configured to expand the working fluid;
    at least one compressor arranged along the ducts and configured to compress the working fluid;
    heat exchangers arranged along the ducts and configured to transfer heat to the working fluid or to absorb heat from the working fluid; and
    at least one combustion chamber arranged along the ducts and configured to actuate an oxy-combustion and to heat the working fluid therewith, wherein
    the plant is configured to actuate a closed cyclic thermodynamic transformation with the working fluid, first in one direction in a charge configuration and then in the opposite direction in a discharge configuration, between said casing and said tank,
    the plant is configured to actuate at least one closed thermodynamic cycle in said closed circuit with said working fluid, and
    the combustion chamber is operationally active at least in the closed circuit to heat the working fluid through an oxy-combustion within the at least one closed thermodynamic cycle and/or the at least one closed cyclic thermodynamic transformation during charging.

2. The plant according to claim 1, further comprising a mixer placed on the ducts upstream of the combustion chamber, wherein
    the mixer has an inlet for oxygen and/or fuel,
    the working fluid passes through the mixer, and
    said mixer is configured to mix oxygen and/or fuel and the working fluid before entering the combustion chamber.

3. The plant according to claim 1, further comprising at least one extraction duct in fluid communication with the ducts and/or the tank and/or the casing to enable the working fluid to be extracted from the plant in a controlled manner.

4. The plant according to claim 1, further comprising at least one inlet duct in communication of fluid with the ducts and/or the tank and/or the casing to allow the working fluid to be introduced into the plant in a controlled manner.

5. The plant according to claim 1, further comprising a recuperator operationally active on the closed circuit to recover heat from the working fluid coming out of the expander and transfer it to the working fluid entering the combustion chamber.

6. The plant according to claim 1, further comprising a further heat exchanger to receive heat from that additional heat source.

7. The plant according to claim 1, further comprising at least one pump configured to increase an inlet pressure into the expander.

8. The plant according to claim 1, wherein
said at least one expander comprises a plurality of expanders arranged in series, and
said at least one combustion chamber is placed upstream of the expanders and/or between the expanders.

9. The plant according to claim 1, wherein said at least one compressor is of the type with or without inter-cooling.

10. The plant according to claim 1, further comprising an extracting device for the extraction of non-condensable gases.

11. The plant according to claim 1, wherein the working fluid has a critical temperature between 0° C. and 200° C. and a density at 25° C. between 0.5 kg/m$^3$ and 10 kg/m$^3$.

12. The plant according to claim 1, wherein the working fluid comprises or consists of $CO_2$ and/or $N_2O$.

13. The plant according to claim 1, wherein the combustion chamber is configured to receive, directly or indirectly, a fuel and oxygen and to introduce products generated by oxy-combustion into the ducts.

14. The plant according to claim 13, further comprising a separator of at least one of the products generated by oxy-combustion placed downstream of an outlet of the expander and configured to separate at least one of the products generated by the oxy-combustion from other products of the oxy-combustion and to extract said other products from the ducts.

15. The plant according to claim 13, wherein the products generated by the oxy-combustion comprise $CO_2$ and/or $N_2O$.

16. The plant according to claim 13, wherein said heat exchangers include:
a first heat exchanger placed, on the charge path, between an outlet of the expander and the tank and/or placed, on the discharge path, between the tank and the combustion chamber, said first heat exchanger being configured to absorb heat from the working fluid in the charge configuration and/or to transfer heat to the working fluid in the discharge configuration; and
a second heat exchanger placed, on the discharge path, between an outlet of the expander and the casing and/or placed, in the closed circuit, between the outlet of the expander and an inlet of the compressor, said second heat exchanger being configured to absorb heat from the working fluid in the discharge configuration and/or to absorb heat from the working fluid in the closed thermodynamic cycle.

17. The plant according to claim 16, further comprising:
a separator of at least one of the products generated by oxy-combustion placed downstream of an outlet of the expander and configured to separate at least one of the products generated by the oxy-combustion from other products of the oxy-combustion and to extract said other products from the ducts; and
a recuperator operationally active on the closed circuit to recover heat from the working fluid coming out of the expander and transfer it to the working fluid entering the combustion chamber, wherein
the second heat exchanger is placed, on the discharge path and in the closed circuit, between the recuperator and the separator, or the second heat exchanger is placed, on the discharge path, between the separator and the casing and, in the closed circuit, between the separator and the compressor.

18. The plant according to claim 16, wherein
said heat exchangers comprise a thermal accumulator placed, on the charge path, between an outlet of the expander and the tank and/or placed, on the discharge path, between the tank and the combustion chamber and/or placed in the closed circuit, and
said thermal accumulator is configured to absorb heat from the working fluid and to store thermal energy in the charge configuration and/or to transfer heat to the working fluid in the discharge configuration.

19. The plant according to claim 18, wherein the first heat exchanger is placed between the tank and the thermal accumulator.

20. A steel plant comprising the plant for energy management according to claim 1, wherein gases produced by said steel plant are at least partly used as fuel in the plant for energy management.

21. A process for energy management, the process comprising:
actuating a closed cyclic thermodynamic transformation, first in one direction in a charge configuration/phase and then in the opposite direction in a discharge configuration/phase, between a casing for the storage of a working fluid other than atmospheric air, in gaseous phase and in equilibrium of pressure with the atmosphere, and a tank for the storage of said working fluid in liquid or super-critical phase with a temperature close to its own critical temperature, in the charge phase the process accumulating heat and potential energy in the form of pressure and in the discharge phase the process generating energy;
actuating, with at least a part of said working fluid, at least one closed thermodynamic cycle; and
heating the working fluid by at least one oxy-combustion within the closed thermodynamic cycle and/or within the closed cyclic thermodynamic transformation during the charge phase.

22. The process according to claim 21, further comprising introducing, from outside and in a controlled manner, a product from other industrial processes into the closed cyclic thermodynamic transformation and/or into the closed thermodynamic cycle, wherein said product becomes part of the working fluid.

23. The process according to claim 21, wherein the closed thermodynamic cycle is recuperative.

24. The process according to claim 21, further comprising extracting non-condensable gases from the working fluid.

25. The process according to claim 21, wherein the working fluid has a critical temperature between 0° C. and 200° C. and a density at 25° C. between 0.5 kg/m$^3$ and 10 kg/m$^3$.

26. The process according to claim 21, wherein the working fluid comprises or consists of $CO_2$ and/or $N_2O$.

27. The process according to claim 21, further comprising introducing fuel and oxygen directly or indirectly into a combustion chamber in which the working fluid flows,
wherein at least one of products generated by the oxy-combustion becomes part of the cyclic thermodynamic transformation and/or the closed thermodynamic cycle.

28. The process according to claim 27, further comprising extracting, in a controlled manner, said at least one of the products generated by the oxy-combustion from the closed cyclic thermodynamic transformation and/or from the closed thermodynamic cycle to store and/or send it to a user.

29. The process according to claim 27, further comprising:
   separating at least one of the products generated by the oxy-combustion from other products of the oxy-combustion; and
   extracting said other products from the process.

30. The process according to claim 27, wherein the products generated by the oxy-combustion comprise $CO_2$ and/or $N_2O$.

\* \* \* \* \*